United States Patent [19]

Flinn et al.

[11] 4,170,860

[45] Oct. 16, 1979

[54] CANDLE MANUFACTURING SYSTEM AND METHOD

[75] Inventors: Robert W. Flinn, Lakewood, Ohio; Roy D. Robinson, Osceola, Ark.

[73] Assignee: American Greetings Corporation, Cleveland, Ohio

[21] Appl. No.: 948,086

[22] Filed: Oct. 2, 1978

Related U.S. Application Data

[62] Division of Ser. No. 777,429, Mar. 14, 1977, Pat. No. 4,131,415.

[51] Int. Cl.[2] .................. B29C 13/00; B29C 17/10

[52] U.S. Cl. .................. 53/170; 118/423; 118/425; 425/93; 425/106; 425/110; 425/155; 425/270; 425/297; 425/301

[58] Field of Search .................. 425/88, 110, 123, 90, 425/100, 103, 106, 269, 270, 289, 301, 306, 803, 383, 384, 392, 394; 118/423, 425; 264/309, 304, 305, 138, 320, 93, 155, 297; 53/170

[56] References Cited

U.S. PATENT DOCUMENTS

| | | | |
|---|---|---|---|
| 2,486,469 | 11/1949 | French | 264/25 |
| 2,529,829 | 11/1950 | Bank | 118/425 |
| 3,256,567 | 6/1966 | Björck | 118/423 |
| 3,390,444 | 7/1968 | Björck | 425/269 |
| 3,453,686 | 7/1969 | Björk | 425/392 |
| 3,681,123 | 8/1972 | Reilly | 425/270 |

*Primary Examiner*—W. E. Hoag
*Attorney, Agent, or Firm*—Baldwin, Egan, Walling & Fetzer

[57] ABSTRACT

A system for the production of dipped taper candles, including an overhead conveyor system supporting mobile carrier racks for formation of the candles in suspended relation from the rack, and including a wicking station for providing rows of candle wicks in generally tensioned suspended relation from a carrier rack, a dipping station for automatically dipping said wicks on the rack through a predetermined number of dipping cycles, a cutoff station for cutting off the bases including the wick tensioning weights of the candles suspended from the carrier rack, a butt forming station for heat forming the cut butt ends of candles suspended from the carrier rack, and a cut down station for expeditiously cutting down the carrier rack rows of the candles formed on the candle wicks and for collecting the same for further processing. The invention also provides a novel method of producing physically uniform candles in mass production batches.

34 Claims, 40 Drawing Figures

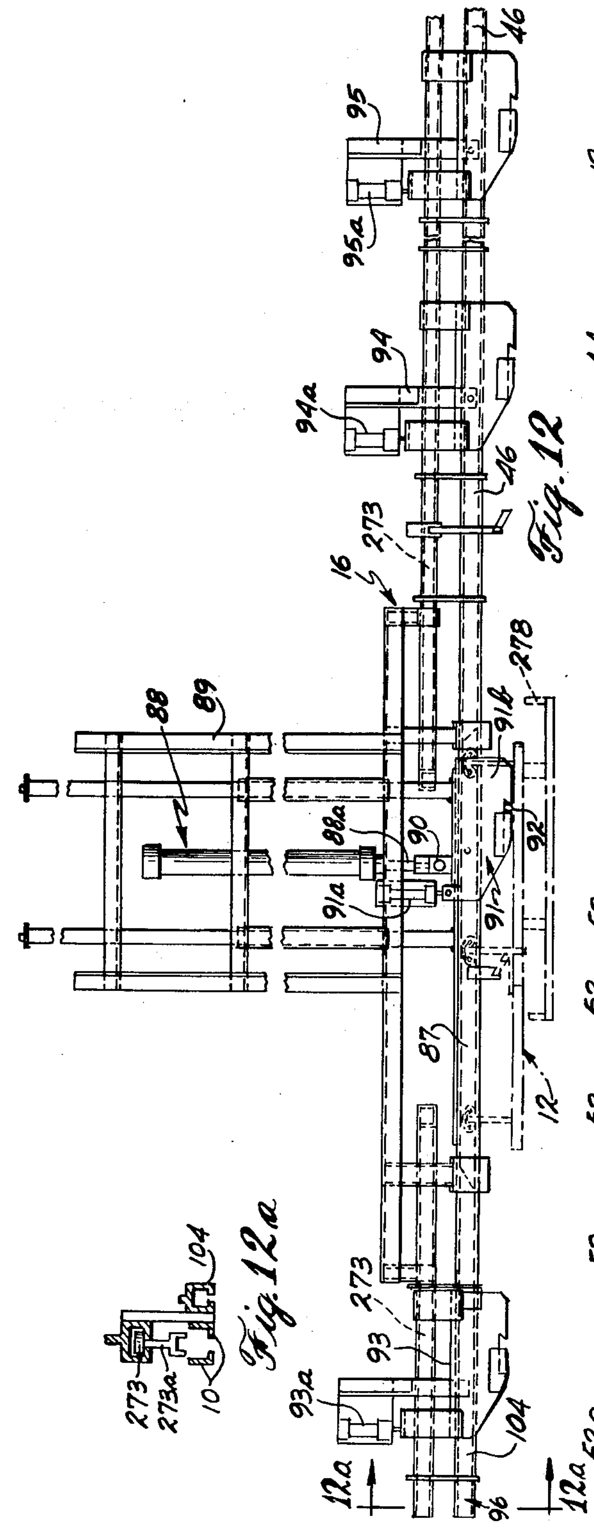
Fig. 12
Fig. 12a
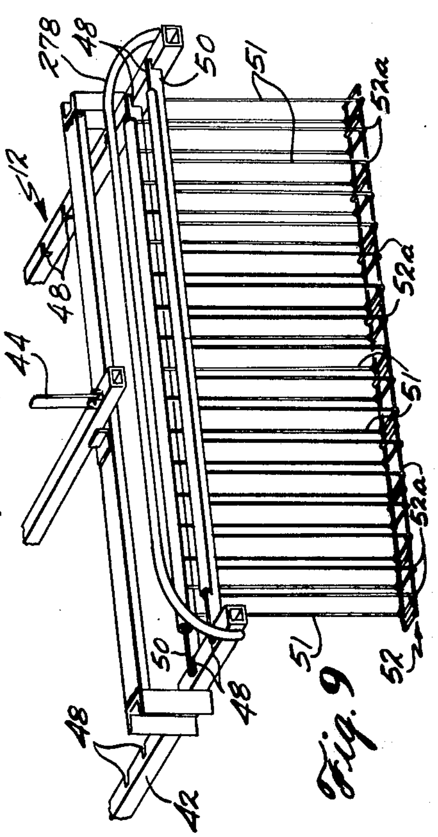
Fig. 9
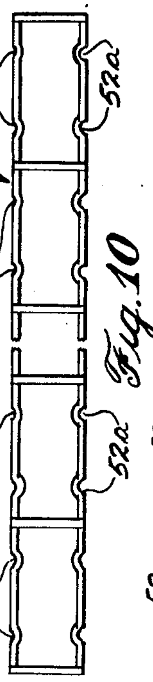
Fig. 10
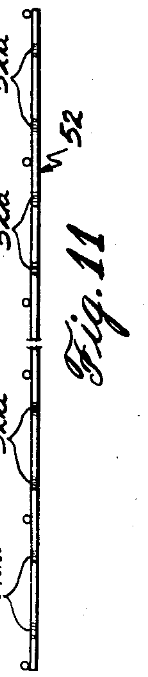
Fig. 11

CANDLE MANUFACTURING SYSTEM AND METHOD

This is a division, of application Ser. No. 777,429, filed Mar. 14, 1977 now U.S. Pat. No. 4,131,415.

This invention relates to a system and method for the production of dipped taper candles, and more particularly relates to a semi-automatic system and method for producing dipped taper candles for the mass production of candles of generally uniform physical characteristics.

BACKGROUND OF THE INVENTION

Candle making either by dipping or by molding is well known art, and many arrangements and mechanisms have been described and are known for producing candles using such processes. However, the majority of these arrangements include a substantial number of hand operated disconnected operations all of which contribute to the cost of the end product. Accordingly, due to the relatively high cost of labor, candles sold in this country have either been relatively expensive or have been imported from foreign countries where labor costs may be lower. U.S. Pat. Nos. 3,256,567, 2,259,829 and 3,390,444 issued June 21, 1966, Nov. 14, 1950 and July 2, 1968 respectively are some examples of prior art relating to devices to accomplish a dipping operation for candle manufacture.

SUMMARY OF THE INVENTION

The present invention provides a semi-automated system for the production of dipped taper candles, and one that results in the mass production of dipped taper candles having generally uniform characteristics.

An object of the present invention is to provide an improved system and novel method for semi-automated production of dipped taper candles.

Another object of the invention is to provide a novel system for the production of dipped taper candles, resulting in an end product of generally uniform characteristics, having uniform size, and long burning, anti-drip characteristics.

A further object of the invention is to provide a system for the production of dipped taper candles which reduces the cost of production of such candles, and yet which results in a candle product having excellent physical characteristics.

A further object of the invention is to provide a system for the production of dipped taper candles which comprises an overhead conveyor system including mobile carrier racks suspended therefrom, with a wicking station for providing rows of candle wicks for attaching the latter in generally tensioned suspended relation on a selected carrier rack, and including a dipping station for automatically dipping the wicks on the carrier rack as a unit through a predetermined number of dipping cycles, for forming the candles, a cutoff station for cutting off the weighted bases of the batch of candles on the respective carrier rack and a forming station for predetermined forming of the cut ends of the candles, and a cut down station for progressively cutting down the rows of formed candles from the carrier rack and for collecting the same for further handling.

A still further object is to provide a system of the latter type which includes an overdip station for applying a further coating to the candles after formation of the bases thereof, and a packaging station for automatic packaging of the candles after they are cut-down at the cut-down station from the respective carrier rack.

Other objects and advantages of the invention will be apparent from the following description taken in conjunction with the accompanying drawings wherein:

BRIEF DESCRIPTION OF THE DRAWINGS

FIG. 9 is a fragmentary, perspective view of one of the mobile carrier racks of the overhead conveyor system, with a row of the candle wick strands suspended therefrom, and held in generally tensioned relation by an associated weight member.

FIGS. 10 and 11 are respectively enlarged, top plan and side elevational views of one of the weight members illustrated in FIG. 9.

FIG. 12 is a fragmentary, side elevational view of the dipping station of the system.

FIG. 12A is a section taken along line 12A—12A of FIG. 12.

FIG. 22 shows the clamping mechanism in active condition, while FIG. 22A illustrates the clamping mechanism in inactive or release condition.

BRIEF DESCRIPTION OF PREFERRED EMBODIMENTS

Figure 1:
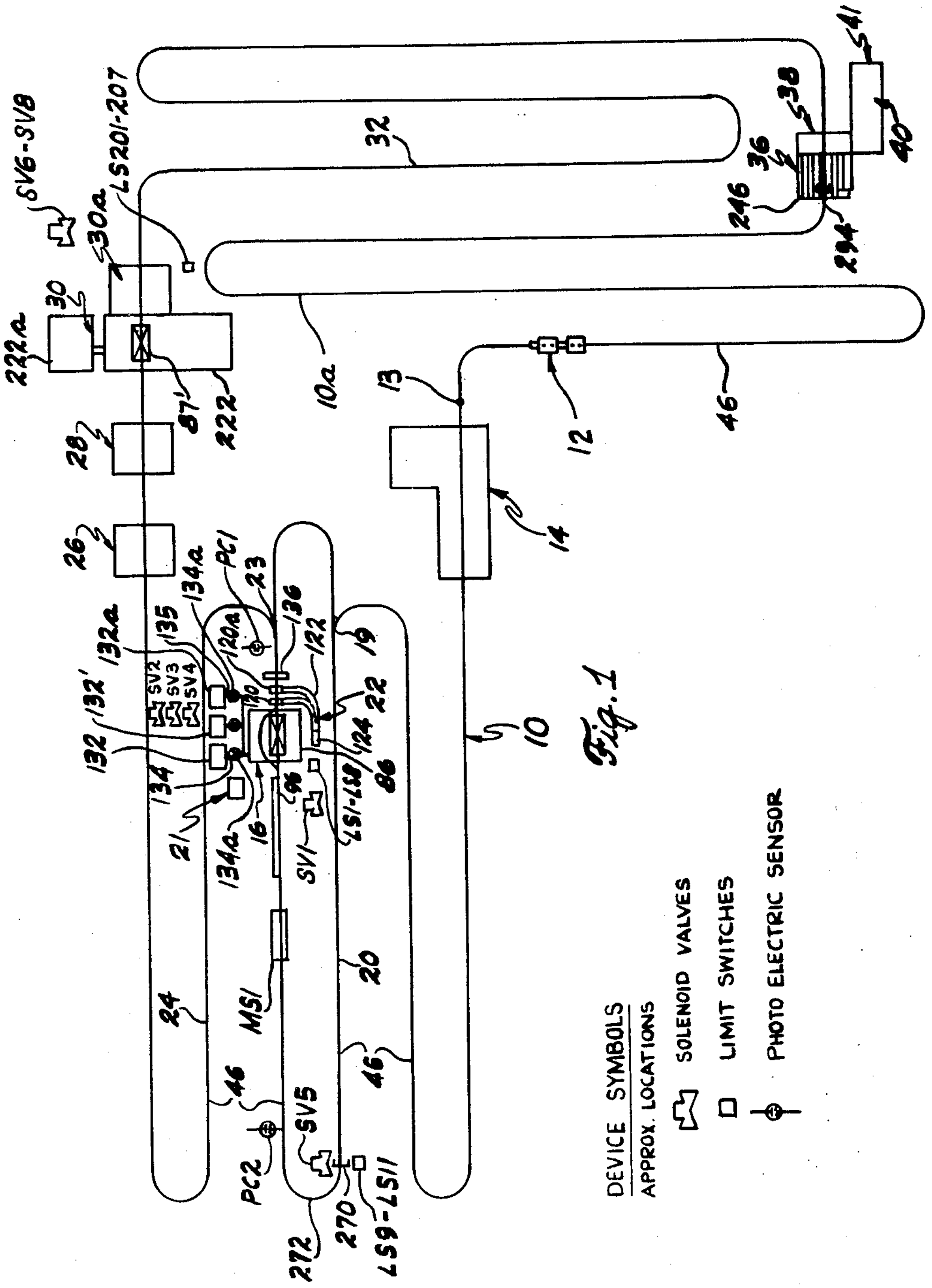
FIG. 1 is a diagrammatic layout of a system constructed in accordance with the invention.
Figure 7:
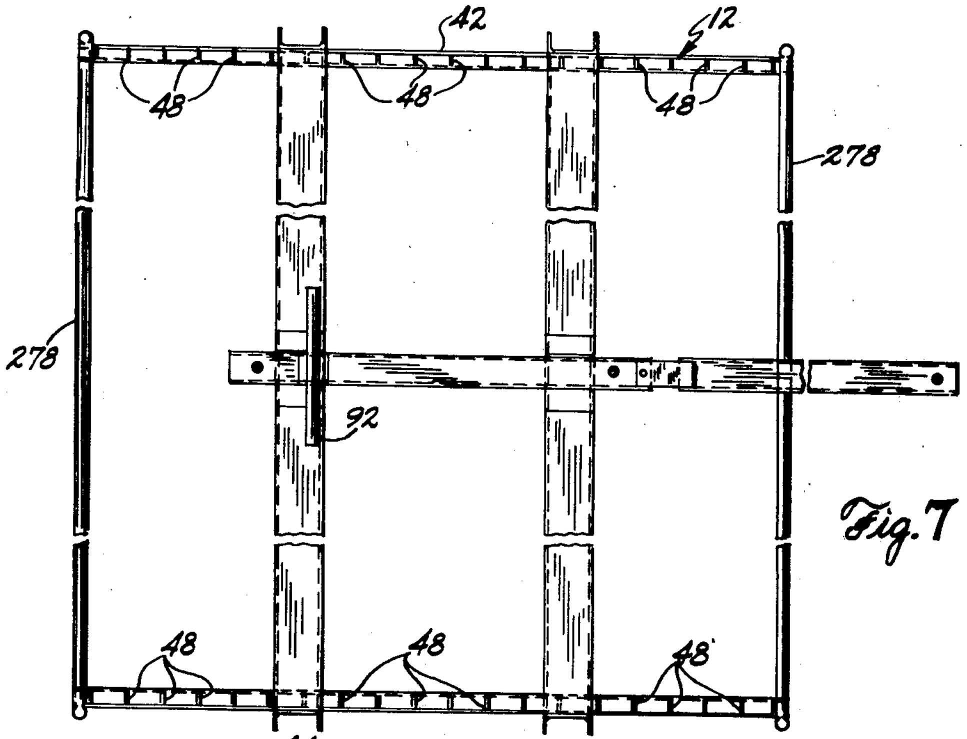
FIG. 7 is a top plan, broken view of one of the carrier racks of the conveyor system for suspending the candle wicks therefrom at the wicking station, and for transporting the candles through the system.
Figure 8:
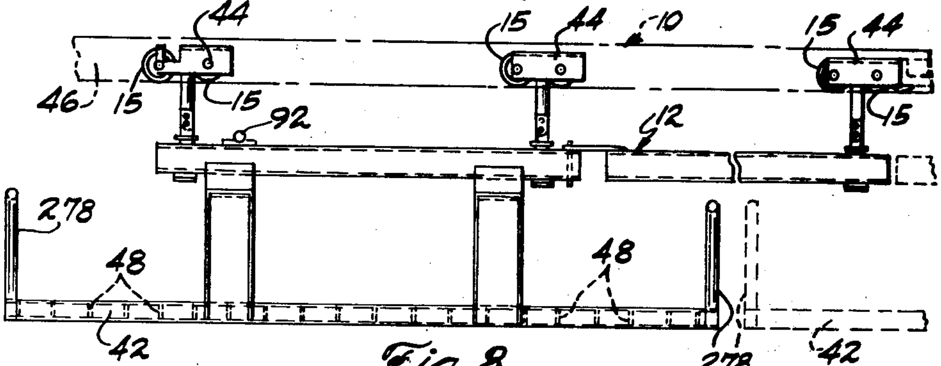
FIG. 8 is a broken, side elevational view of the FIG. 7 carrier rack.
Figure 23:
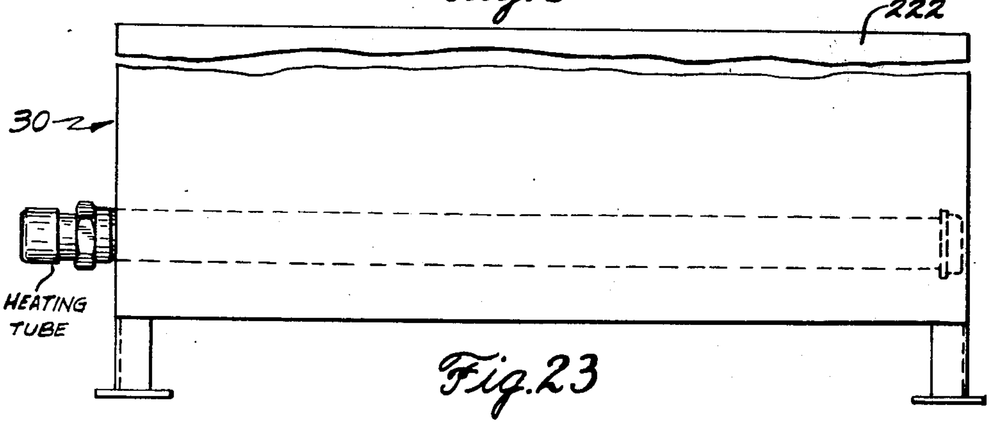
FIG. 23 is a broken elevational view of the wax tank at the over-dip station where a coating is applied to the candles for improving the burning characteristics and appearance thereof.

Referring now to FIG. 1, there is illustrated diagrammatically a system for mass producing dipped taper candles, and comprising in general an overhead conveyor mechanism including a conveyor track 10. The system may include a holding area 10*a* in which mobile carrier racks 12 (FIGS. 7 and 8) are temporarily stored or positioned, preparatory to positioning at the initial or starting point 13 in the system, for the production of dipped taper candles. The carrier racks 12 are preferably wheeled as at 15 (FIG. 8) so as to make them readily mobile with respect to the overhead track. From the holding area 10*a*, the carrier racks in groups or individually, may be moved either by manual or by power actuation to the wicking station 14 of the system, for producing rows of candle wicks, on the carrier racks and for attaching the wicks in suspended relation from the racks, preparatory to moving the racks to dipping station 16 where the candle bodies are formed.

Workmen at the wicking station 14 will attach a series of rows of candle wicks to the associated carrier rack with a weight supported thereon, thereby providing a generally tensioned relation of the wicks strands on the rack. Preferably a plurality of carrier racks are assembled and provided with rows of dependent candle wick strands, as for instance 20 carrier racks each having mounted thereon a selected number of wicks (e.g. 400) and then at crossover point 19 on the conveyor the carrier racks will be fed into automatic dipping loop portion 20 of the system. The carrier racks with the candle wicks depending therefrom, will be automatically picked up by the power system of the overhead conveyor in portion 20, and accumulated in front of the aforementioned dipping station 16.

At the dipping station, each rack is automatically fed into a power operated dipping mechanism which lowers the respective rack and dips the depending wicks thereon into a tank of molten wax or other suitable candle forming material, lowering the wicks down into the tank of wax and raising them up in a predetermined time cycle, after which the dipped wicks are passed over an air cooling means 22, and automatically recycled back through the dipping loop portion 20 of the conveyor to the dipping station for the next dipping cycle. This continues through a preselected number of cycles (e.g. approximately 25).

After a batch of the candles have been formed in the dipping cycle section 20 of the overhead conveyor and have been processed to the operator's satisfaction, the latter will turn a selector switch on the control panel 21 from automatic to manual, which will allow the carrier rack and associated candles to cycle through the vertical dip station section 16 of the conveyor system without lowering, so that the total batch of racks with the candles formed thereon can be fed out of the dipping process loop portion 20 at exit point or frog 23, into portion 24 of the overhead conveyor track, and to the base cutoff station 26, whereat the bases of the dip formed candles, including the aformentioned weights, are cut off while the candles are suspended from the respective carrier rack, for transference of the wax coated weights back to the dipping tank wax supply. The candles are then moved to the butt forming station 28, for forming the cut base ends of each of the candles into a predetermined butt end configuration.

The racks of candles are then generally moved to a over-dip coating station 30 where they are coated with a color coat of wax or a further white coat of wax, for improving the burning characteristics and the appearance of the candles, after which each rack of coated candles is pushed into a spraying or quenching station 30*a* where a liquid spray cools the candles.

Figure 29:
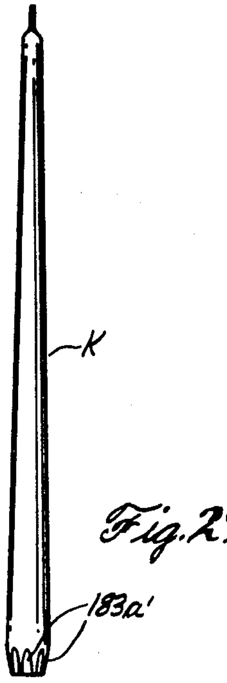
FIG. 29 is a side elevational view of one of the finished candles produced in the system of the invention.
Figure 29A:
FIG. 29A is an end view of the base or butt end of the candle as formed at the butt forming station of FIGS. 21 and 22.

The candles are then automatically moved along conveyor track section 32 to a cut down station 36 where the rows of candles on each carrier rack are sequentially cut down, and from whence they may be transported by conveyor mechanism 38 to a packaging machine 40 which automatically packages the candles and transports them to a shipping area 41 for further handling. FIGS. 29 and 29A illustrate a candle product which may be formed in the system of the invention.

Details of the System Including the Individual Machines

Carrier Rack Assembly. The mobile carrier racks 12 for the overhead conveyor system comprise a support frame 42 suspended by means of trolleys 44 embodying the aforementioned wheels 15, which in turn run on and pivotally support the carrier rack on the overhead conveyor track 10 (shown in phantom lines in FIG. 8). Frame 42 has a series of slots 48 therein which are adapted to receive bar members 50 (FIG. 9) suspending the ends of a series of lengths of candle wicks 51 and in generally suspended tensioned relation as caused by an associated weight member 52, as will be hereinafter described in greater detail in connection with the aforementioned wicking station 14. Weights 52 may be formed of any suitable material, such as for instance metal wire, and have recesses 52*a* on the periphery thereof for locating the candle wicks when the latter are suspended from a respective carrier rack 12 (FIG. 9).

Figure 2:
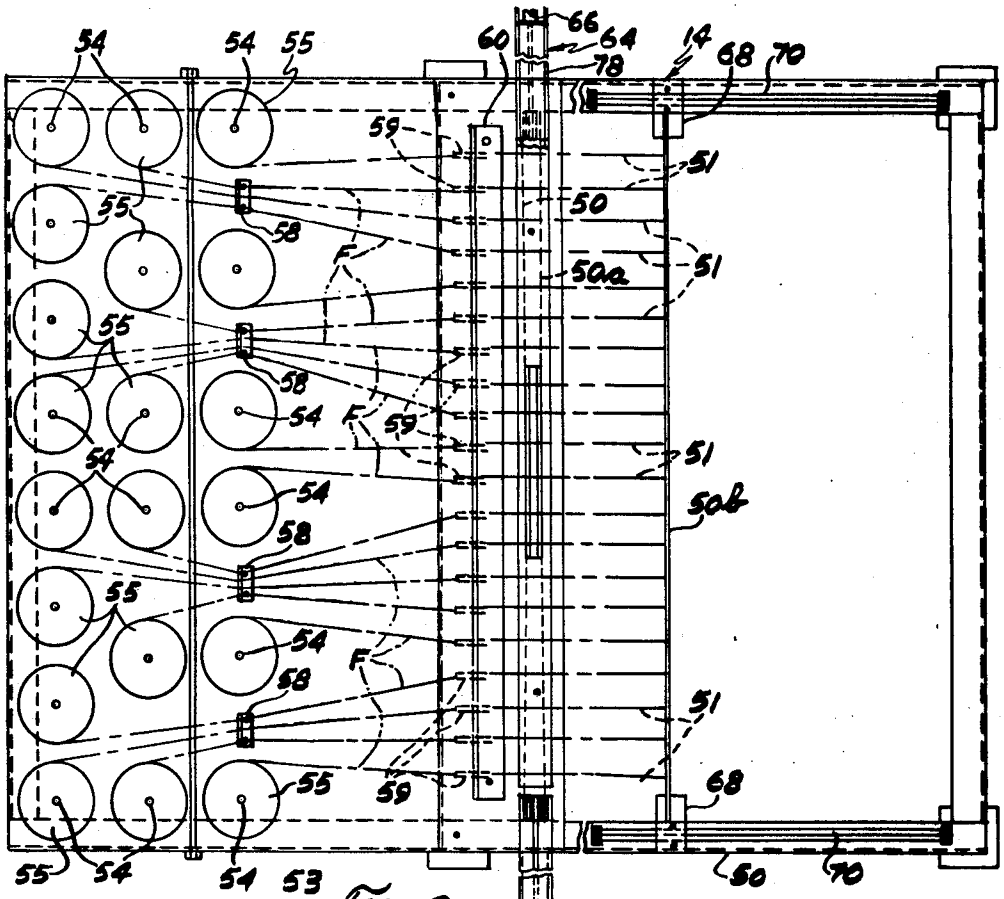
FIG. 2 is a top plan, broken view of the wicking station of the system.
Figure 3:
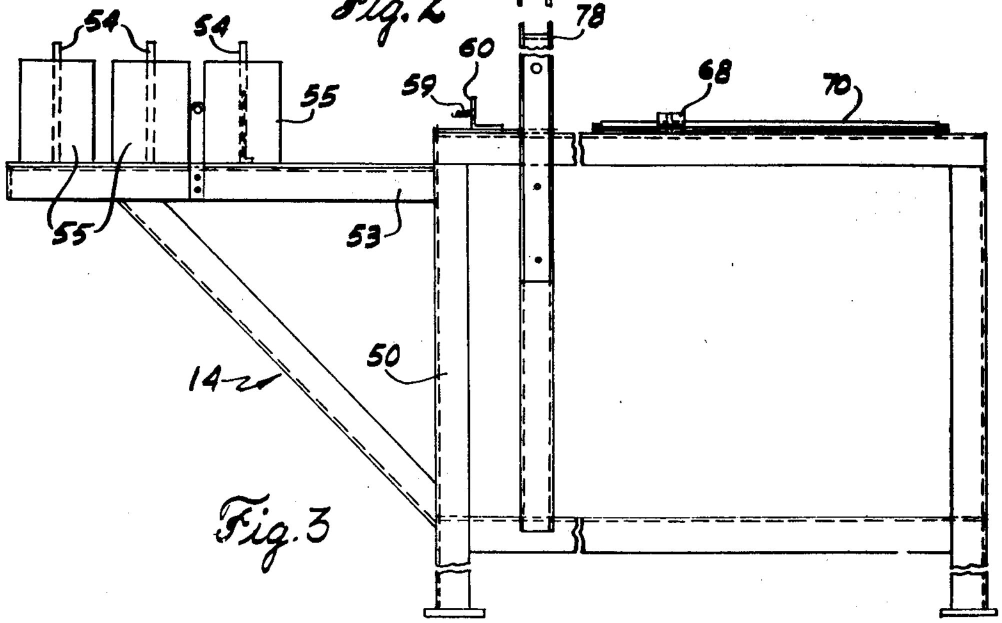
FIG. 3 is a broken side elevational view of the wicking station of FIG. 2.
Figure 5:
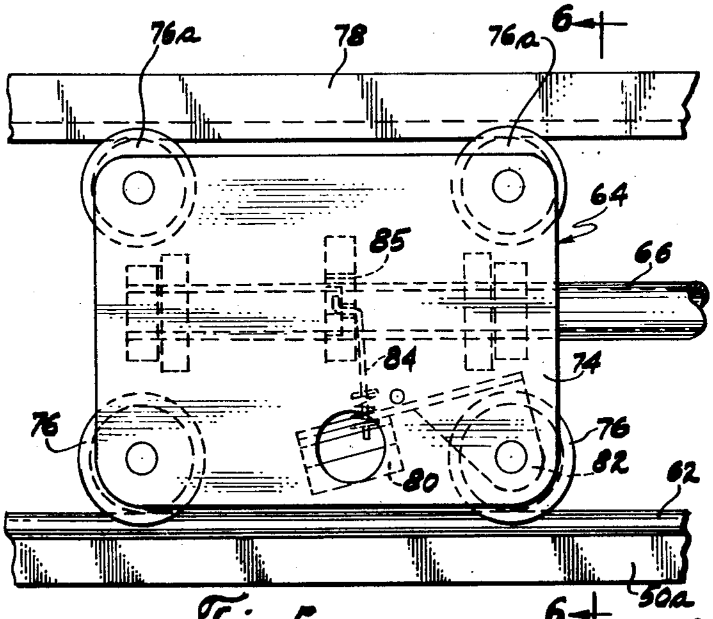
FIG. 5 is an enlarged, fragmentary, elevational view of the cutter mechanism of the wicking station.
Figure 4:
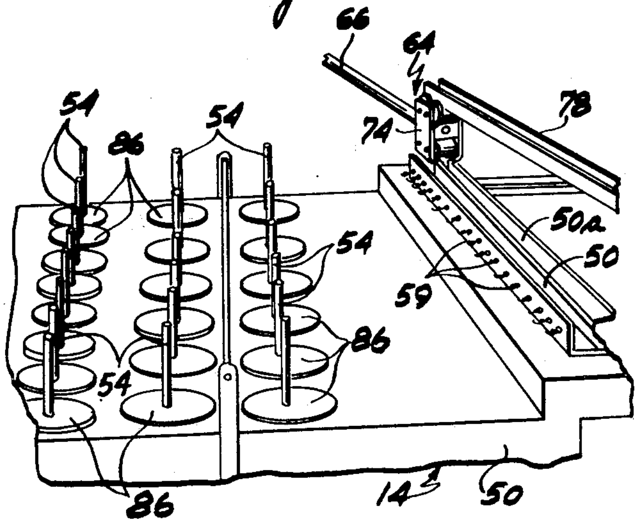
FIG. 4 is a perspective, fragmentary view illustrating the wicking station and the cutter used for cutting the candle wicks pulled from spools of wick material, to predetermined length.
Figure 6:
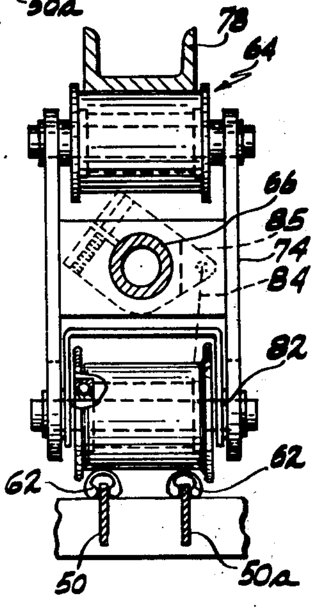
FIG. 6 is a view taken generally along the plane of line 6—6 of FIG. 5 looking in the direction of the arrows.

Wicking Station. Wicking station 14 comprises a frame 53 (FIGS. 2 and 3) providing a platform having a plurality of spindles 54 thereon, which spindles receive in relative rotatable relation a respective spool 55 of filamentary material, which is adapted to provide the wicks for the candles. The filaments or strands F from the spools 55 of wick material may be passed through guide brackets 58 (FIG. 2) and thence through spring guides 59 disposed in openings in a guide bar 60. From the guide bar 60, the strands of wick material are manually pulled over spaced removable retainer bars 50, 50*a* and 50*b* (FIG. 2) with retainer bar 50*b* providing for holding or securing one end of the wick filament sections thereto and in a manner to be hereinafter described. The filament strands F are held to the respective retainer bar 50, 50*a* and 50*b* preferably by means of a generally flexible plastic elongated clip 62 (FIGS. 5 and 6). Clips 62 may be formed of, for instance semirigid plastic and which act to secure the strand or filaments F to the respective retainer bar. After the filaments are stretched out between the retainer bars and secured thereto by means of the aforementioned fastener clips 62, a cutter mechanism 64 (FIGS. 4, 5 and 6) is manually, in the embodiment illustrated, actuated as by means of push-pull rod 66. The position of bar 50*b* with respect to bar 50*a* is adjustable, as by selectively moving the support brackets 68, which removably receive bar 50*b* thereon, lengthwise along guideways 70 on wicking frame 53, thereby providing for the production of different lengths of candle wicks.

Cutter 64 comprises a carriage 74 (FIGS. 4, 5 and 6) rotatably mounting rollers 76, 67*a* thereon, with upper rollers 76*a* adapted to roll in guided relation on upper track 78 while lower rollers 76 are adapted to ride on the aforementioned retainer bars 50, 50*a*, and in this connection, roll or force the fastener clips 62 into snap fastened, gripping coaction with the bars 50, 50*a*, as the cutter mechanism 64 moves lengthwise along guide rail 78 and transverse of the wicking station frame 53. The handle 66 of the cutter 64 is adapted for actuating a cutter blade 80 pivotally mounted as at 82 to the body of the cutter mechanism 64. The pivotable blade 80 is connected, as by means of spring loaded link 84, to cam 85 adjustably secured to the rotatable handle 66. Thus, after the cutter mechanism 64 is moved lengthwise with respect to the track 78 and in a manner so as to cause the clip strips 62 to be forced into gripping coaction with the underlying retainer bars 50, 50*a*, and to secure the wick filaments F to the bars, manual rotation of handle 66 will cause downward pivoting of blade 80 into operative cutting position, so that when the cutter mechanism 64 is returned or pulled back to its starting position (as illustrated for instance in FIG. 4) the blade 80 is operative to cut the strands which extend between and are fastened to bars 50, 50*a*. It will be seen therefore that after the latter cutting operation the bar 50*a* is securing one end of the wick strands, and the bar 50*b*, spaced a preselected distance from bar 50*a*, is securing the other end of the wick strands which are in suspended relation therebetween. A weight member 52 of the type illustrated for instance in FIGS. 10 and 11 is then placed intermediate the bars 50*a*, 50*b* and on the wick strand sections 51 and the bars 50*a*, 50*b* are raised out of their supported position in the wicking station frame and are hung on the framework of the overhead carrier rack 12 to form a generally U-shaped configuration as illustrated in FIG. 9.

Thereafter, the retainer bar 50 with the cut ends of the filaments from the spools 55 secured thereto, is moved upwardly from its slot position in the cutter trackway on the wicking station framework and new retainer bars are inserted down into the receiving slots therefor, and then bar 50 with the filaments from the spools 55 secured thereto is moved in a direction toward the right (with respect to FIG. 2) and is inserted in the slotted brackets 68, thereby setting up another batch of candle wicks for cutting by cutter mechanism 64. Clips 62 are placed on the new bars 50, 50*a* and the cutter 64 is actuated to cause the clips to grip the filament strands to the respective new retainer bars 50, 50*a*.

It will be noted that as the strands of wick material are pulled to the right, as above described, by the rightward movement of bar 50 with the cut ends of the strands attached thereto, the spools of filament material rotate on rotatable discs 86 (FIG. 4) permitting the strand material to be readily fed off of the spools and through the guide bar 60. It will also be understood that the spring loaded link 84 on the cutter mechanism 64, maintains the cutter blade 80 out of cutting position with respect to the strands, until such time as the handle 66 is rotated and held in rotated position, so as to cause the blade 80 to become operative to cut the strands.

Once the respective overhead carrier rack 12 is loaded with the U-configuration of tensioned wicks, such carrier rack is moved from the wicking station toward dipping loop section 20 of the conveyor system and a new carrier rack is positioned at the wicking station. In the embodiment illustrated there is provided for 400 candle wicks on each carrier rack. Assuming that a group of 20 carrier racks is to be assembled for the candle produced in the system during cycling of the 20 carrier racks through the system. After the predetermined number of carrier racks are completed provided with the necessary number of weight tensioned candle wick assemblies the carrier racks are moved into the dipping loop portion 20 of the conveyor system at cross over point 19, preparatory to the dipping operation. This movement of the carrier racks can either be manual or powered movement by a suitable powered feeder mechanism, one of which will be hereinafter described.

Figure 13:
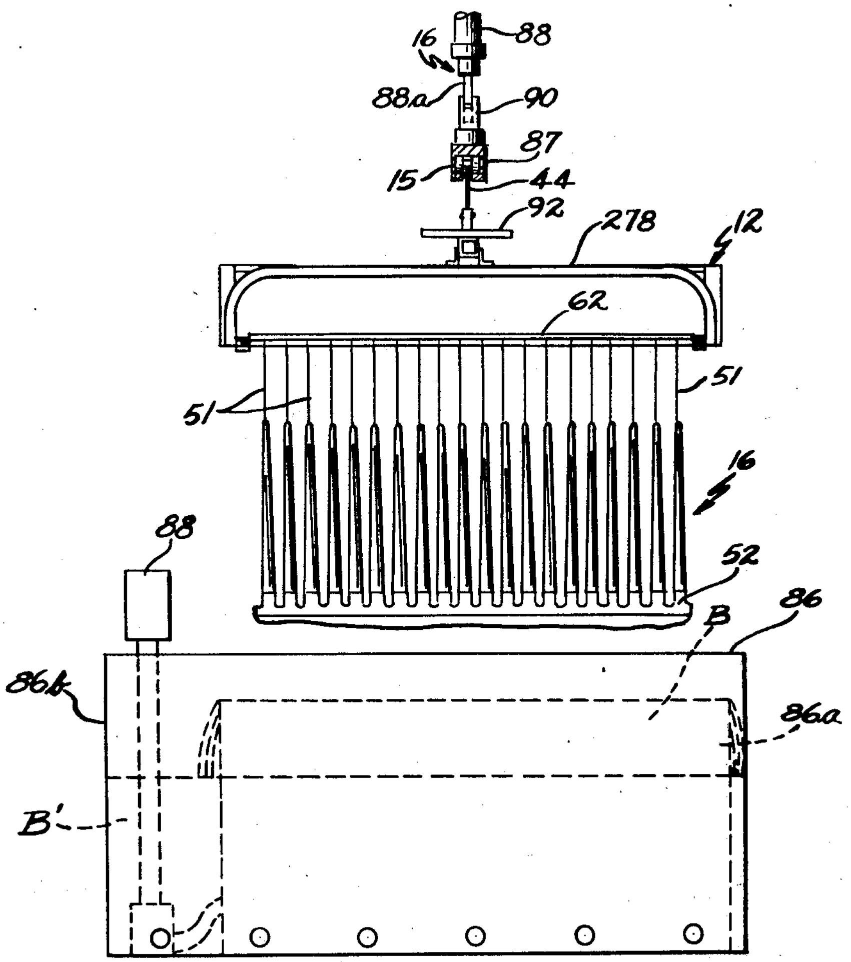
FIG. 13 is an end elevational generally diagrammatic view showing a carrier rack with the weighted wicks and formed candles thereon after a predetermined number of dipping cycles into the tank of wax at the dipping station, in the formation process for the candles.

Dipping Station. The dipping station 16, as shown for instance in FIG. 13, comprises a tank 86 containing a bath B of molten wax or other suitable candle forming material. Tank 86 includes an inner tank section 86*a*, where the bath B is maintained to the very top of tank section 86*a*, and an outer tank section 86*b* which collects the overflow of melted wax from the inner tank 86*a*. The level of wax in inner tank 86*a* is continuously maintained at the very top and in overflowing condition by pump 88 during candle making operations. Suitable, preferably electrical, heating means coacting with tank 86 maintains the dipping bath B and the over flow bath B′ in liquid condition, dipping bath B and the over flow bath B′ in liquid condition, with the wax thereof preferably maintained at a temperature of approximately 160°–165° F.

The overhead conveyor track includes a separable section 87 (FIG. 12) which is movable vertically relative to the remainder of the overhead conveyor. A fluid powered double acting motor unit 88 is mounted on framework 89 disposed above the movable conveyor track section, with the piston rod 88*a* of the motor unit coupled as at 90, to the movable conveyor track section 87. Accordingly, upon actuation of the motor unit 88, the movable conveyor track section 87 and respective supported carrier rack and candle wicks, are moved vertically down toward the underlying tank 86 of molten wax material, and upon deactuation, the motor unit moves the conveyor track section and respective supported carrier rack 12 upwardly away from the tank. A stop mechanism 91 (FIG. 12) is secured to the movable track section 87, and which automatically locks the associated carrier rack 12 in position on the movable track section. Stop mechanism 91 is preferably power actuated, as by means of fluid powered, reciprocal motor 91*a*, operable to pivot locking plate 91*b* having a notch 91*c* therein. Notch 91*c* is adapted to coact with lateral bar 92 on the carrier rack, and hold the latter in predetermined position.

Since the candle wicks 51 are supported, as aforedescribed, in tensioned relation on a respective carrier rack, upon lowering of the latter, the wicks are dipped into the melted wax for the formation of the candle body on the respective wick. The wick weights 52 likewise are coated with wax during this dipping process.

The overhead conveyor at the dipping station includes power actuated carrier rack stop mechanism 93, 94 and 95 positioned respectively ahead of and behind the movable conveyor track section 87, for the purpose of accomplishing proper positioning of the respective carrier rack, onto the vertically movable elevator section 87 of the conveyor track, and off the movable elevator conveyor track section, after dipping of the candle wicks has occurred. Carrier stop mechanism 93, 94 and 95 are generally similar to stop mechanism 91 aforedescribed, and their purpose will be hereinafter more fully discussed.

A plurality of the carrier racks, as for example 20 of them, may be fed into the power dipping loop section 20 of the conveyor system (FIG. 1) where the carrier racks are automatically picked up by a power system unit MS1 for such loop section, and are accumulated in front of the dipping station 16.

Figure 30:
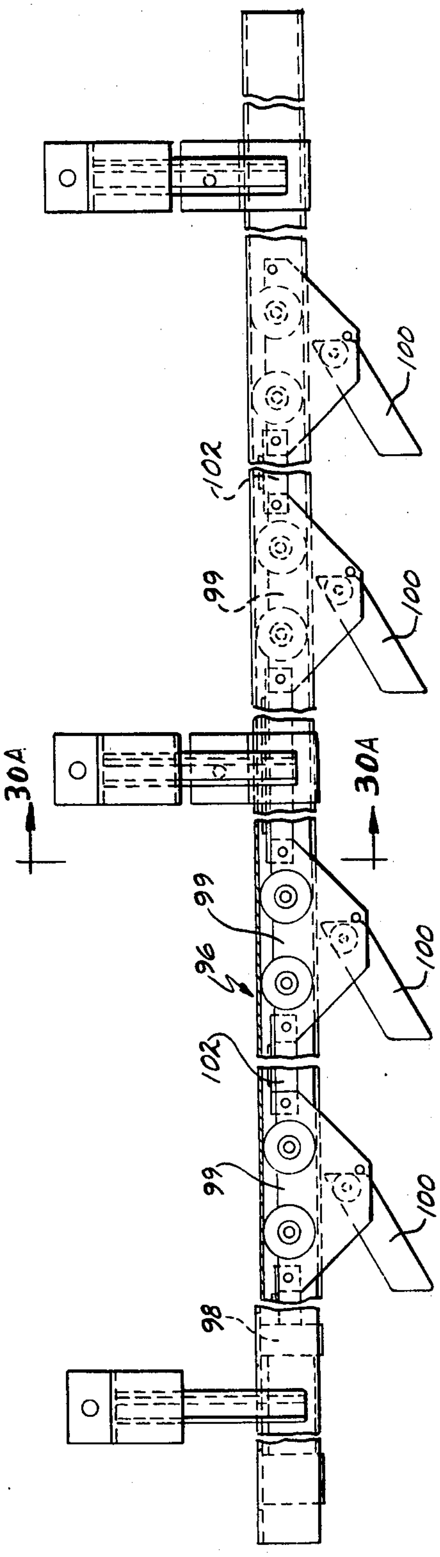
FIG. 30 is a broken, partially sectioned side elevational view of one of the fluid powered feeder mechanisms of the system, for moving the racks on the conveyor at the dipping and over-dip stations.
Figure 30A:
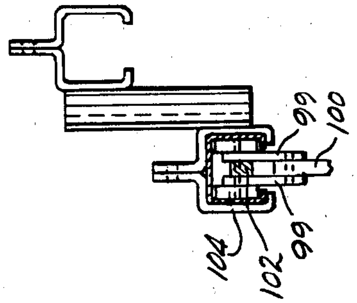
FIG. 30A is a section along line 30A—30A of FIG. 30.

Referring now to FIG. 30, a power feed unit 96 for the conveyor loop section 20, in the embodiment illustrated, comprises a reciprical, double acting fluid powered motor unit 98 coupled to trollys 99 each having a retractable (in one rotary direction) actuating arm 100, with such trollys being coupled together by coupling elements 102 spacing the actuating arms 100 a predetermined distance apart. The actuating arms 100 are adapted to engage the cross bar 92 on a respective carrier rack, and upon actuation of the piston rod of the motor unit 98, to cause forward movement of the wick supporting carrier racks.

It will be seen that the motor unit 98 controls the movement of the carrier racks along dipping loop section 20 of the conveyor system, thus moving a line of the carrier racks from a position in front of the dipping station 16 where the first of the racks coact with the aforementioned front stop mechanism 93 (FIG. 12) to be automatically located for movement into the elevator section 87 of the dipping station and as will be hereinafter described in further detail. As can be seen from FIG. 12A, the track 104 on which the power system trollys 99 run is disposed in the embodiment illustrated, at approximately the same elevation as compared to the conveyor track 10 on which the wheeled carriages 44 for the carrier racks run and laterally thereof.

Figure 14:
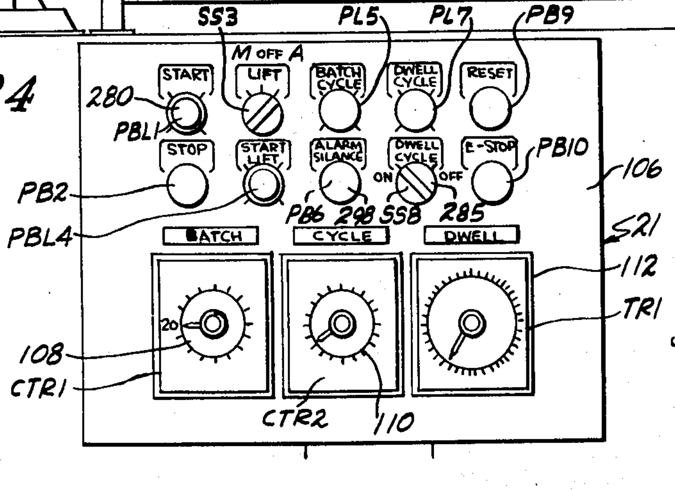
FIG. 14 is a partial elevational view of the control console for controlling the dipping operation cycle.

Control Operation At Dipping Station. The controls 106 at the dipping station may be as follows: Referring to FIG. 14, the operator will set one counter dial 108 to correspond to the size or number of the carrier racks (e.g. the aforementioned 20). Another dial 110 may be manually set by the machine operator for the number of required dipping cycles for the batch of carrier racks. The controls 106 at the dipping station are variable and selectable, so that the number of dipping cycles for each carrier rack batch and also the number of carrier racks in the batch, are selectively variable, and such counters may be adjusted as for instance from number zero through 99 counts. Also a control 112 (FIGS. 14 and 32) is provided on the console so that the operator can program the first dip for the wicks on each carrier rack for a predetermined extra period of time, called a "soak period," for ensuring that the wax in the tank 86 is generally completely absorbed into each of the submerged wicks.

The operator may then turn the selector switch SS3 to the automatic cycle position and can push the start button PBL4, and the power feed mechanism 96 will automatically load the first carrier rack from the forward hold position just ahead of the vertical lift mechanism of the dipping station 16 into the vertical lift 87, and simultaneously unload a carrier rack (if one happens to be disposed in the vertical lift elevator mechanism) onto the subsequent section 46 (FIG. 12) of the overhead conveyor track. The vertical lift mechanism 87 will immediately lower and then raise back up after predetermined time period, and will continually repeat such cycle as the undipped racks are automatically loaded into the vertical lift mechanism and the dipped racks are automatically moved out of the vertical mechanism by the feed mechanism 96. After each dipping cycle, the lock mechanism 91, 93, 94 and 95 are automatically deactuated to permit the progression of carrier racks into and from the elevator 87.

As each carrier rack is fed by the feed mechanism 96 from the vertical lift, that will decrease the batch counter by 1 count, and will simultaneously decrease the cycle timer 110 by 1 so that the operator will be able to identify the number of cycles that each bath has yet to make in the dipping loop section 20. It has been determined that approximately 25 dipping cycles are usually sufficient to provide candles of the desired diameter size, depending on certain factors such as weather conditions, wax consistency, etc. Accordingly, more or less dipping cycles may be required under varying conditions. The control 110, as aforementioned, allows for this selection. After the selected number of dipping cycles is accomplished, in the embodiment illustrated a bell rings and the feed drive 96 of the dipping loop section of the conveyor stops.

Figure 18:
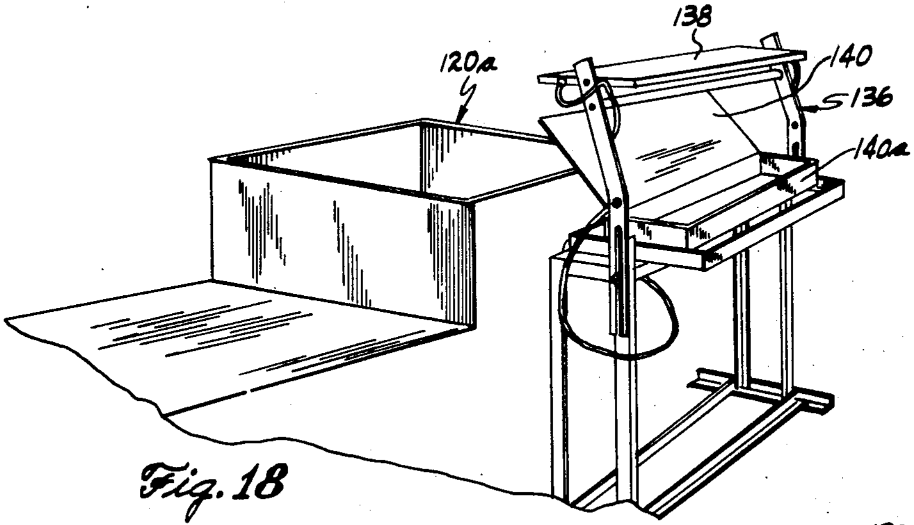
FIG. 18 is a perspective view of a heating plate mechanism over which the formed candles pass for removing, by heat, wax projeftions depending from the underside of the respective batch of candles on the rack.
Figure 17:
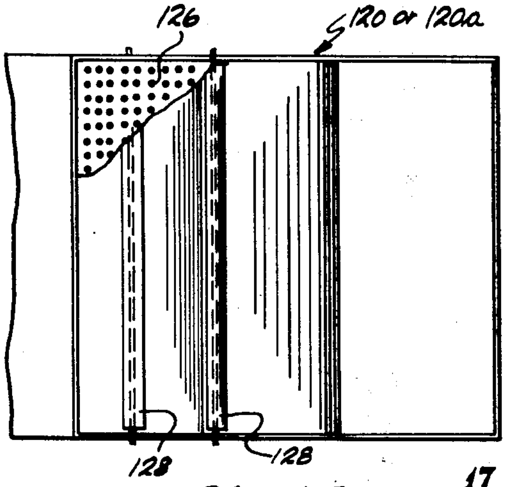
FIG. 17 is a fragmentary, top plan view of the air exit end from the cooling duct system of FIG. 16, illustrating the apertured baffle plate means therein for providing more uniform application of the air flow to the underside of the racks of suspended candles.
Figure 16:
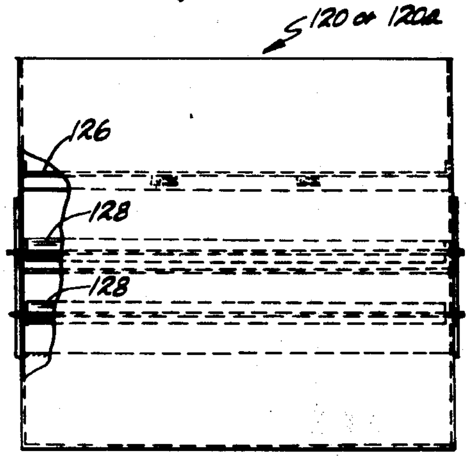
FIG. 16 is a partially broken, end elevational view of the duct of FIG. 15 taken along the plane of line 16—16 of FIG. 15.
Figure 15:
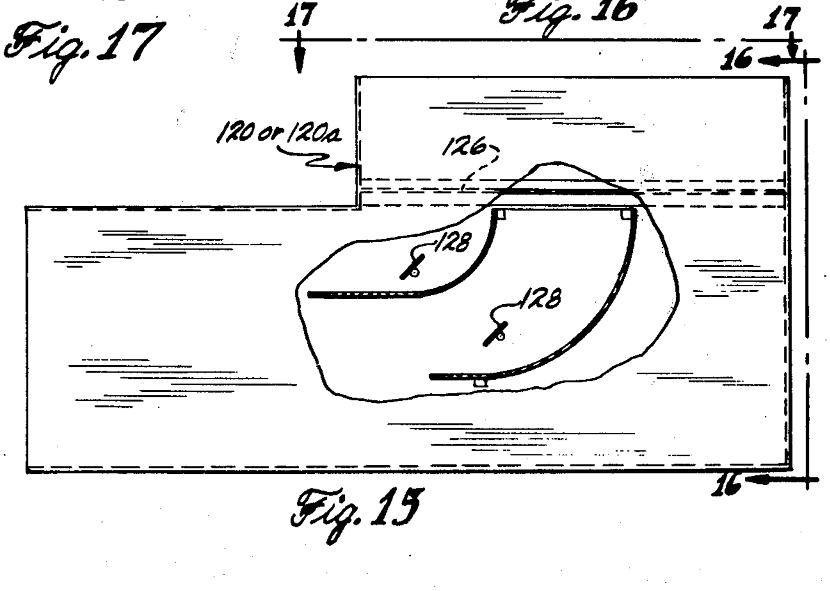
FIG. 15 is an enlarged side elevational view illustrating the cooling duct system, which is adapted to coact with the racks of candles after a complete dipping cycle, for cooling the batches of candles suspended by their wicks from the racks.

During the automatic dipping sequence, each carrier rack pauses in two positions immediately following each vertical dipping operation. These two positions as determined by stops 94, 95 are located over air duct exits 120, 120a FIGS. 1 and 18 which provide air for "cooling" the candles. The air ducts 122 defining exits 120, 120a are connected to a fan 124, and such exits open upwardly, as shown for instance in FIGS. 16 and 17. The fan forces room temperature air up through the candles generally parallel to the direction of extension of the candles, thereby causing disruption of the air between the candles and maintaining generally uniform cooling throughout the candles on the overlying rack, resulting in a generally uniform diameter of candle throughout the respective batch. Accordingly, the candles disposed interiorly of a batch suspended from the carrier rack are of substantially the same uniform diameter as the candles on the outer edge, which because of their greater exposure to room air would ordinarily cool more rapidly. The exit ports 120, 120a for the air ducts have a respective apertured grid 126 therein as well as coacting baffles 128, which aid in uniformly defusing and controlling the upward flow of air emitted from the exit opening on the respective duct, and thereby ensuring a more uniform cooling of the candles suspended from the respective carrier rack.

After a selected number of carrier racks with their respective batched of candles have been processed to the operator's satisfaction, in the embodiment illustrated, he may turn a selector switch SS3 (FIG. 14) from automatic to manual which will allow the carrier racks to pass through the vertical lift without the latter being lowered, so that the total batch of finished dipped tapers on the carrier racks can then be fed out of the power loop section 20 into conveyor section 24 preparatory for movement to the base cutoff station 26. As can be seen from FIG. 1, the overhead conveyor track is provided with switch 23 which can be manually controlled by the system operator, so as to permit directed movement of the carrier racks from the powered dipping loop section 20 into section 24 of the conveyor system.

Make-Up Tanks For Wax. Associated with the dipping station tank 86 are a plurality of make-up tanks 132, 132', 132a (FIG. 1) for wax which are operatively coupled to one another and to the dipping tank 86 by means of piping 134. Wax in the make-up tanks is fed by gravity into the dip tank 86, for maintaining the supply of wax in the dip tank at a predetermined level. In the embodiment illustrated, the wax level in inner tank section 86a is adequate to keep the wax down (e.g. one inch) from the location of the attachment of the wicks to the conveyor rack when a particular carrier rack and mounting conveyor track section 87 is moved to the lowermost position during the dipping operation. A float switch (not shown) may be provided in the dip tank 86 for automatically controlling the level of wax in the outer section 86b of the dip tank, and for automatically opening and closing an associated valve to control the gravity flow of molten wax from the make-up tanks to the dip tank. Manual valve means 134a (FIG. 1) may be provided for manually shutting off the make-up tanks if desired, or necessary. The make-up tanks are heated as by electric heating means and in the embodiment illustrated the temperature is preferably thermostatically controlled by a conventional thermostatic system, thereby ensuring that the wax in the make-up tanks will not become overheated.

Two of the make-up tanks (e.g. 132, 132') are adapted to contain new wax while the other 132a of the make-up tanks is adapted to contain old wax recovered from the system and placed back in the tank for reuse. The exit port 135 from old wax tank 132a is preferably located well above the bottom of the tank, so that the weights 52 from which some of the old wax is reclaimed, will, when added to the tank, always be disposed below the surface liquid wax already in the tank, and will not interfere with the exiting of the liquid wax from the tank. Weights 52 can be periodically recovered from the old wax tank for reuse at the wicking station 14.

In this connection, the wax coated weights are collected at base cut off station 26 preferably in wire baskets, which are then transferred to tank 134a, for deposit therein, and as will be hereinafter discussed.

One of the "new wax" tanks (e.g. 132) can be used to supply liquid wax to the dipping tank, while the other "new wax" tank can be used for preparation of a new batch of "new wax". After the wax in one of the "new wax" tanks is at or near exhaustion, the other "new wax" tank can be placed on line and the exhausted tank removed from on line, for preparation of a new batch of wax therein.

Hot Plate Station. A station 136 (FIG. 1) is provided interiorly of the dipping loop conveyor section 20 of the conveyor system, so that wax projections formed on and depending from the tensioning weights during the dipping cycle for the candles are removed from the batch of candles in an expeditious manner, prior to movement of each carrier rack and associated depending batch of candles back to the dipping station 16, during the candle formation process.

Station 136 comprises, in the embodiment illustrated, an electrically heated surface or plate 138 (FIG. 18) which is disposed at a level so that it is engaged by the lower ends of the formed candles on the respective carrier rack, as the rack moves along conveyor section 20 from cooling duct exit 120a (FIG. 1). This engagement of the lower ends of the candles with the heated plate 138 causes the "drip" projections on the bottom of the candles to be removed or melted off, with the melted wax falling or running by gravity down deflector surface 140 into receptacle 140a where it solidifies, due to the ambient air temperature, and then such recovered wax is subsequently placed back into the aforementioned wax holding tank 132a for reuse.

BUTT CUTOFF STATION

Figure 19:
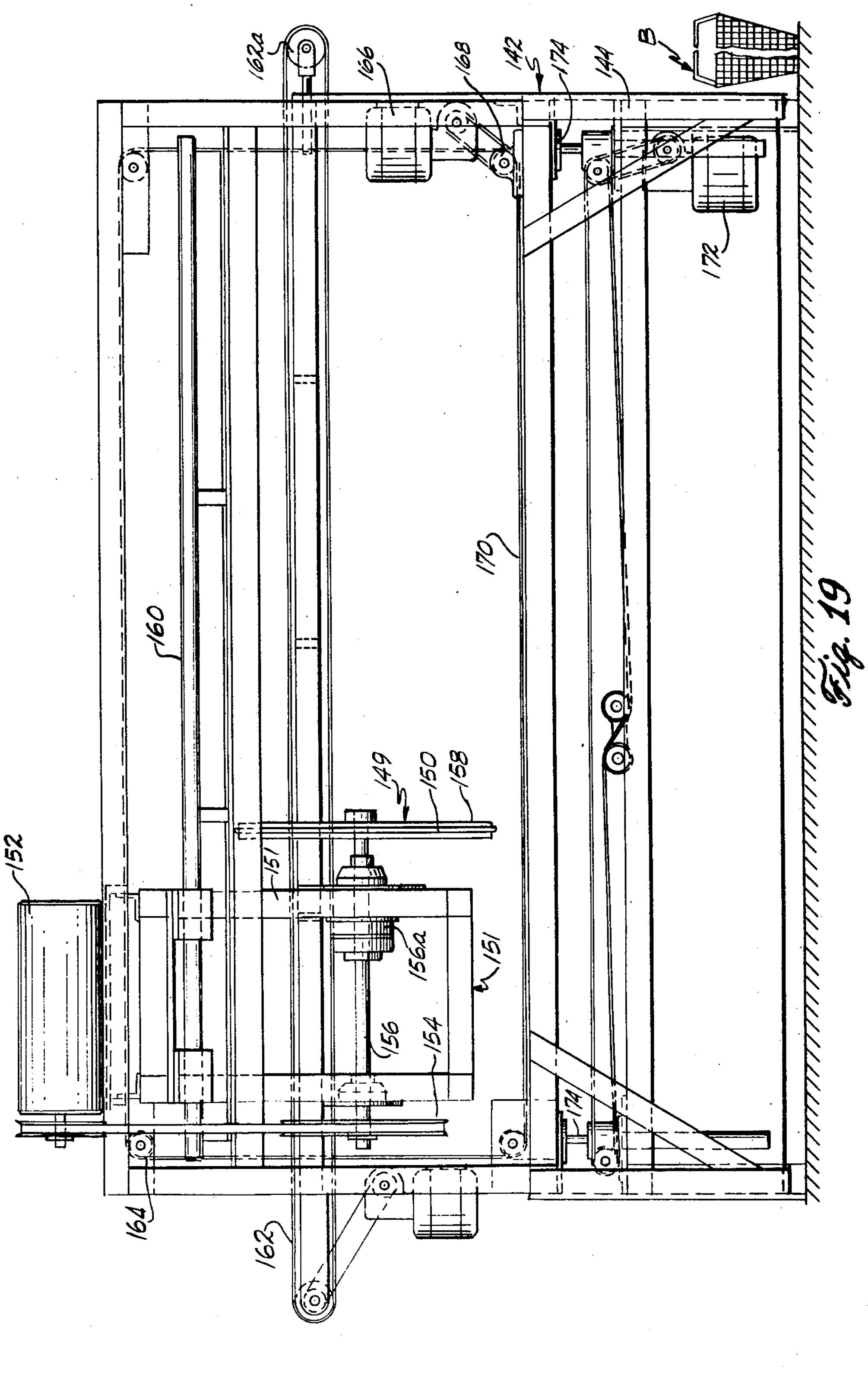
FIG. 19 is a side elevational view of the cutoff machine at the cutoff station for cutting off the bases and associated weights of the candles suspended from a rack.
Figure 20:
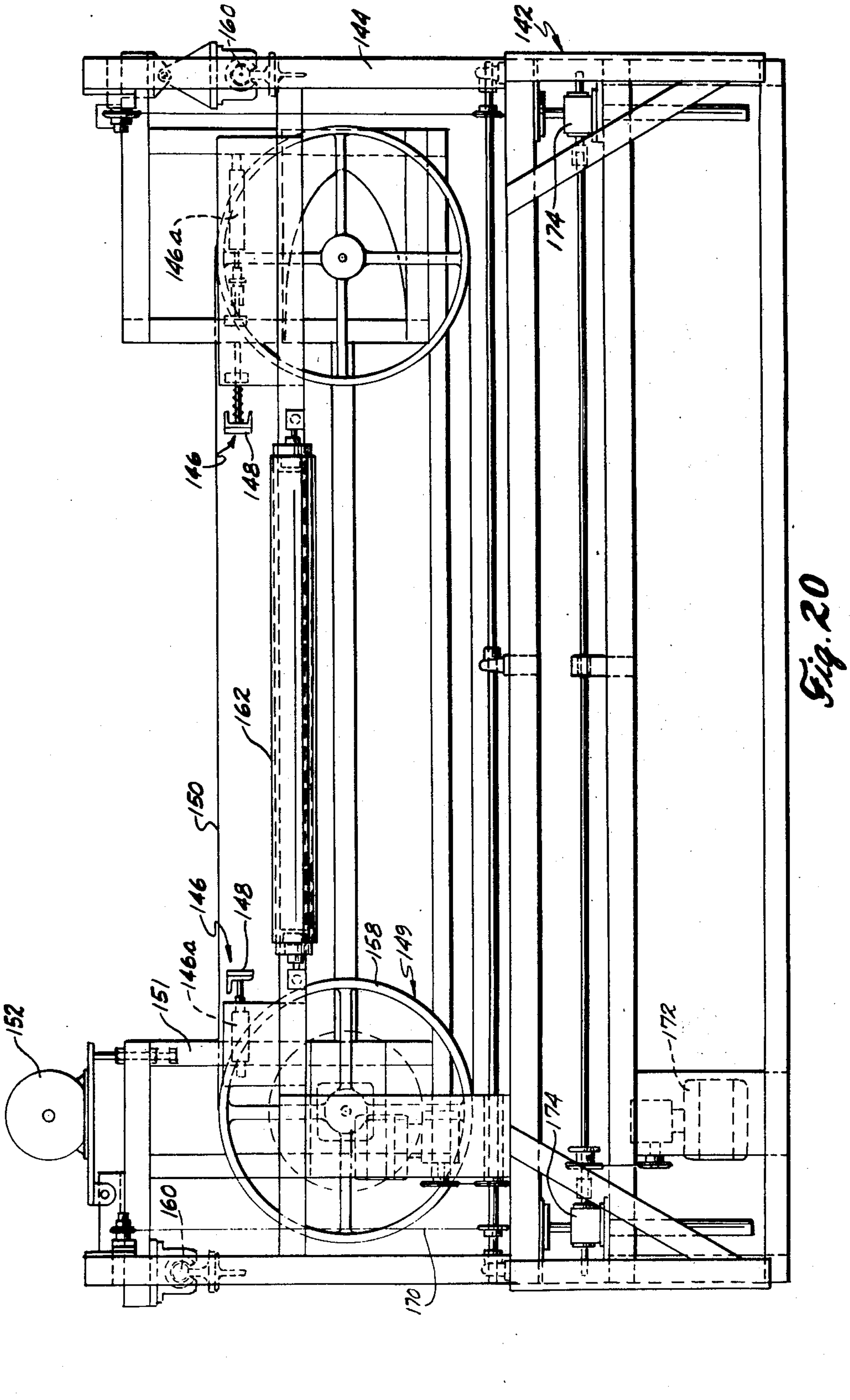
FIG. 20 is an end elevational view of the cutoff machine of FIG. 19.

Referring to FIGS. 1, 19 and 20, there is illustrated a mechanism at station 26 for cutting off the butt or lower end portions of the batch of dipped candles, including the weights 52 which initially tensioned the candle wicks during the dipping cycle. Such cutoff machine 142 (FIGS. 19 and 20) comprises a frame 144, supporting a clamping means 146 which includes fluid powered motor units 146a for actuating the clamping bars 148 extending longitudinally of the machine. The overhead carrier rack with the batch of formed candles including the wax covered candle weights suspended therefrom (FIG. 13) is moved between the clamp bars 148 and an operator starts the machine, causing inward actuation of the fluid powered motor units 146a, to cause the clamp bars to clamp the opposing ends of wick weights 52.

The cutter 149 of mechanism 142, in the embodiment illustrated comprises an endless blade or wire 150 (FIG.

20) which is preferably heated by conventional electric heating means (not shown). Cutter 149 which is mounted on a carriage 151 for movement lengthwise of the machine 142 is automatically actuated as for instance by motor unit 152 upon starting up of the machine, which drives the drive wheel 154 coupled by shaft 156 and a friction clutch 156*a* to the cutter wheel 158. Since the candles are rigidly held by the clamping mechanism 146, the cutting mechanism with its carriage moving longitudinally of the machine on tracks 160, slices through the lower end portions of the candles causing the wax coated weights and lower ends of the candle bodies to be cut off, whereupon they drop down onto powered endless belt conveyor 162 where such weights and cut ends are carried to the discharge end 162*a* thereof, and deposited preferably in the aforementioned wire baskets B, for subsequent return of the wax covered wick weights and candle ends to the aforementioned "old" wax handling tank 132*a*.

Upon completion of a full pass by the cutter carriage, the cutter carriage automatically returns to its starting position (FIG. 19) which in turn causes release of the clamping mechanism 146. The carrier rack with the cut candles depending therefrom is then moved on the overhead conveyor track to the butt forming station 28 and is properly positioned with respect thereto by stop mechanism similar to aforedescribed stop mechanism 91.

The carriage 151 of cutter mechanism 149 is caused to transverse on its tracks by means of chain and sprocket system 164. Motor unit 166 drives sprocket 168 which is coupled by chain 170 to the cutter carriage 151. The upper portion of the butt cutoff machine including the cutter unit and the clamping unit 146, are adjustable vertically by means of motor unit 172 and coacting screw mechanism 174, thereby providing for clamping of different lengths of dipped candles suspended from an associated carrier rack. Energization of motor unit 172 will cause rotary movement of units 174 and driving of the upper portion of the machine in one or the other vertical directions (i.e. either up or down).

Butt Forming Station. The butt forming station 28 comprises a mechanism including a frame 176 having an elevator portion 178 (FIG. 21) which is adapted to be actuated up and down by a motor unit 180 and coacting nut and screw mechanism 180*a*. The elevator portion supports a plurality (400 in the embodiment shown) of butt cups 182 disposed in rows thereon, which are adapted to be raised with the elevator and mold form the bottoms of overlying candles into predetermined configuration. Each cup 182 has an upwardly facing recess 182*a* therein, and are preferably electrically heated so as to mold the cut candle bottoms into a pleasingly appearing, utilitarian bottom as illustrated for instance in FIG. 29A. Convergent surface 183 guides the candle bottom into open ended recess 182*a*, with projections 183*a* heat forming the indentations 183*a'* on the candle base.

In order to ensure that the candles remain stationary while the butt forming cups are raised into engagement with respective candles, there is provided on the station 28 machine a clamping mechanism 184 (FIGS. 22, 22A), which automatically clamps the respective rack supported overlying batch of candles, at the tops thereof, so that they will not move during formation of the bottoms. Such clamping mechanism is adapted to clamp the top portions of each row of the candles, and firmly hold the respective candles while the elevator 178 raises up with the base forming cups 182 mounted thereon and heat forms the base of each of the candles.

Figure 22:
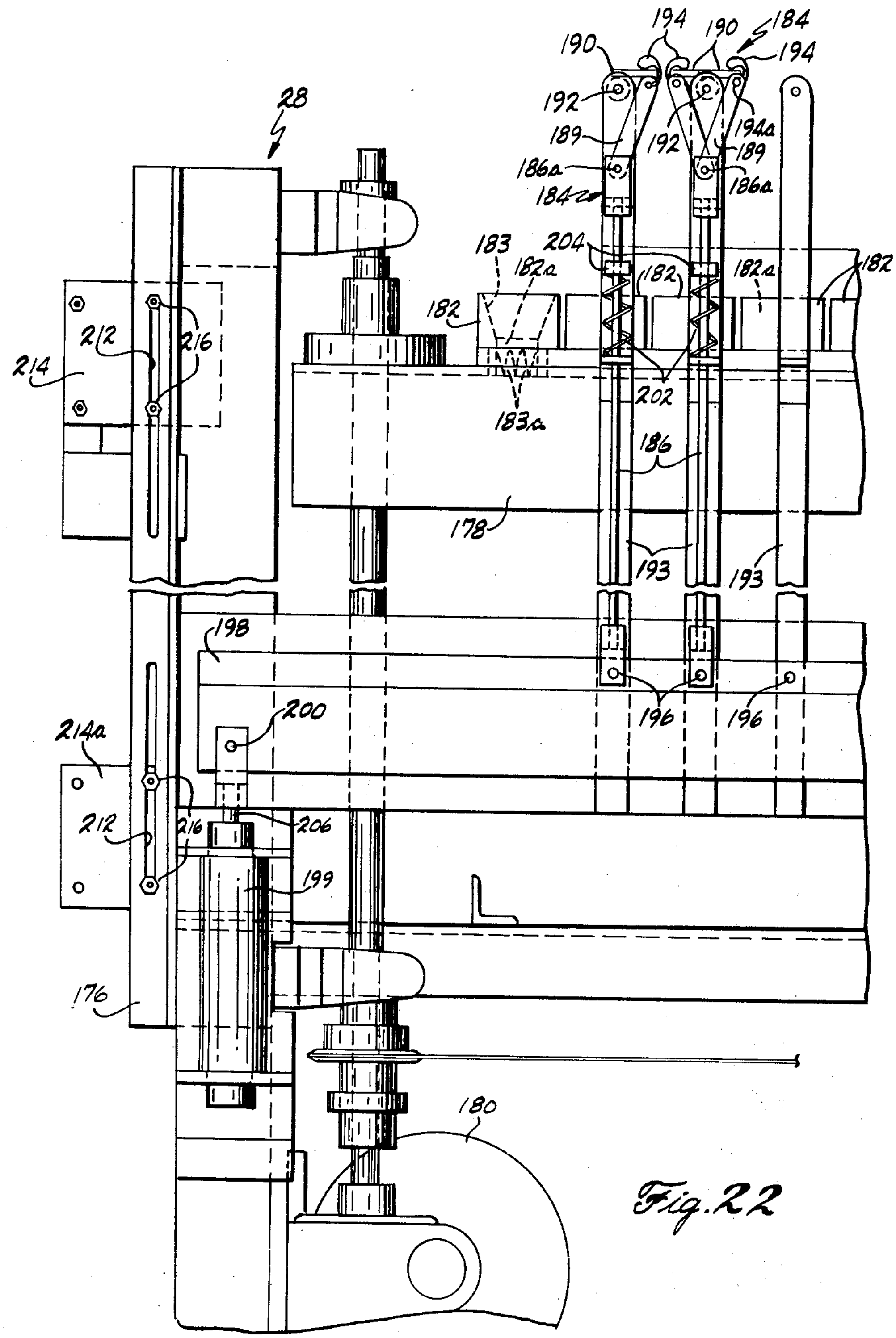
FIGS. 22, 22A illustrate a broken detailed view of the clamping mechanism on the butt forming machine for clamping the upper ends of the candles and maintaining their condition stationary during the butt forming operation.
Figure 22A:
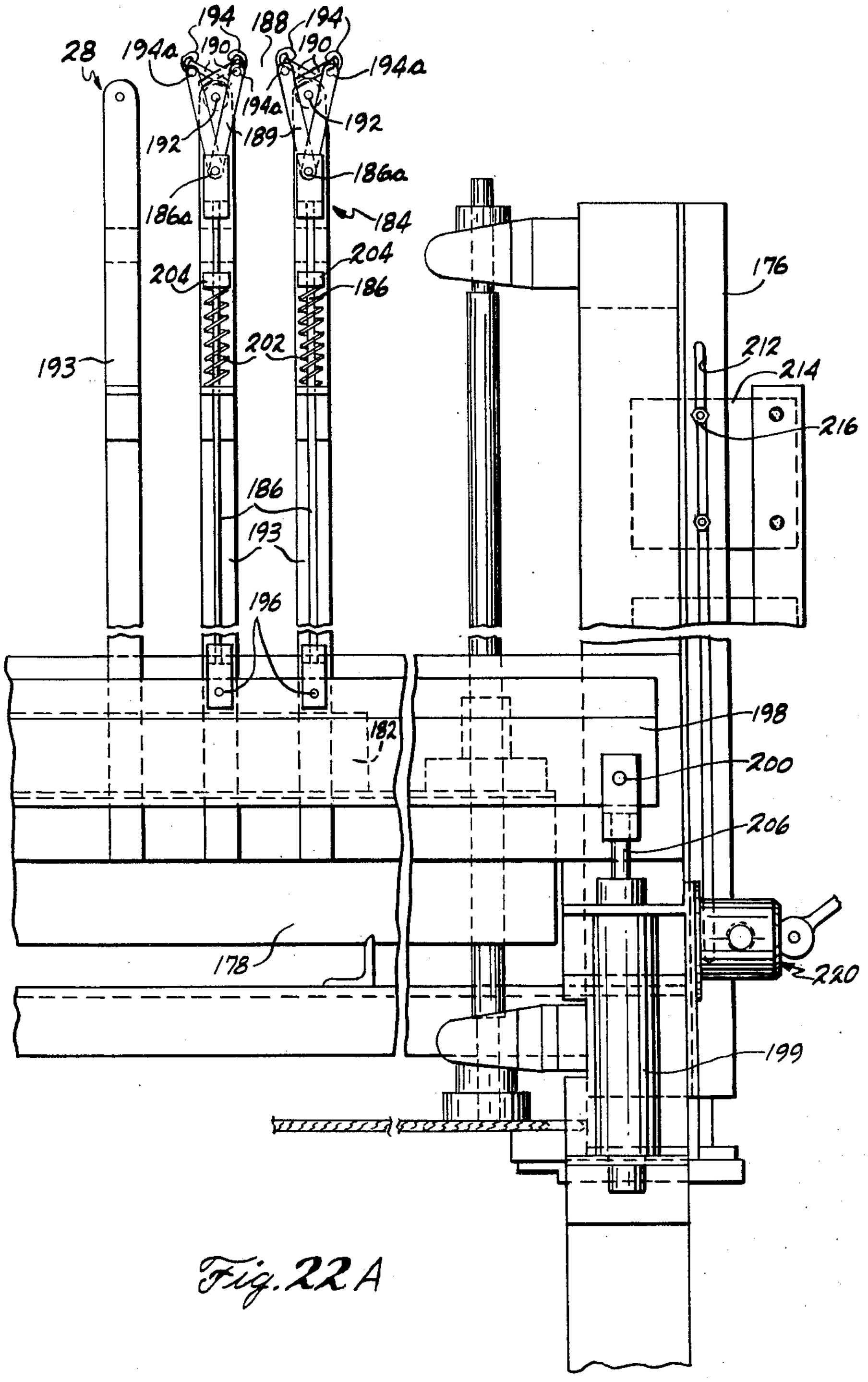

Clamping mechanism 184 comprises a plurality of spaced spring loaded vertically movable arms 186 which when in inactive position (FIG. 22A) provide spaces 188 for receiving between adjacent arms a respective row of the suspended candles. Each arm 186 is coupled as at 186*a* to movable fingers 189 which in turn are coupled to a respective section of hinge-like structure 190 which is pivoted or pinned as at 192 to respective spaced frame columns 193. Generally C-shaped gripper 194 is secured to the respective hinge section of hinge structure 190 and moves or pivots therewith. The lower end of each arm 186 is movably coupled as at 196 to beam 198 which is vertically movable by reciprocal motor units 199 coupled as at 200 to the beam 198, for raising and lowering arms 186. Compression springs 202 coacting with adjustable abutment 204 on the respective arm 186, resists downward movement of the arm upon inward movement of the piston rod 206 of motor unit 199. In the retracted condition of the motor units 199 as shown in FIG. 22, the arms 186 attached to beam 198 have been pulled downwardly against the resistance to compression of springs 202, and the fingers 189 and associated gripper strips 194 are moved to the FIG. 22 position, wherein the upper sections of the candles would be gripped and held stationary between opposing gripper strips. Upon extension of piston rod 206 of motor units 199, beam 198, and attached arms 186 are raised thus causing the hinge sections of structure 190 to pivot about axis 192 to the FIG. 22A position, causing opposing grippers 194 to move away from one another and release the intermediate candles. The gripper members 194 while firmly clamping the candles, are preferably formed of somewhat yieldable material, such as plastic or semi-hard rubber, so that they do not damage the candles that are being held. The other end of the clamping mechanism 184 may be generally similar to the end illustrated.

Figure 21:
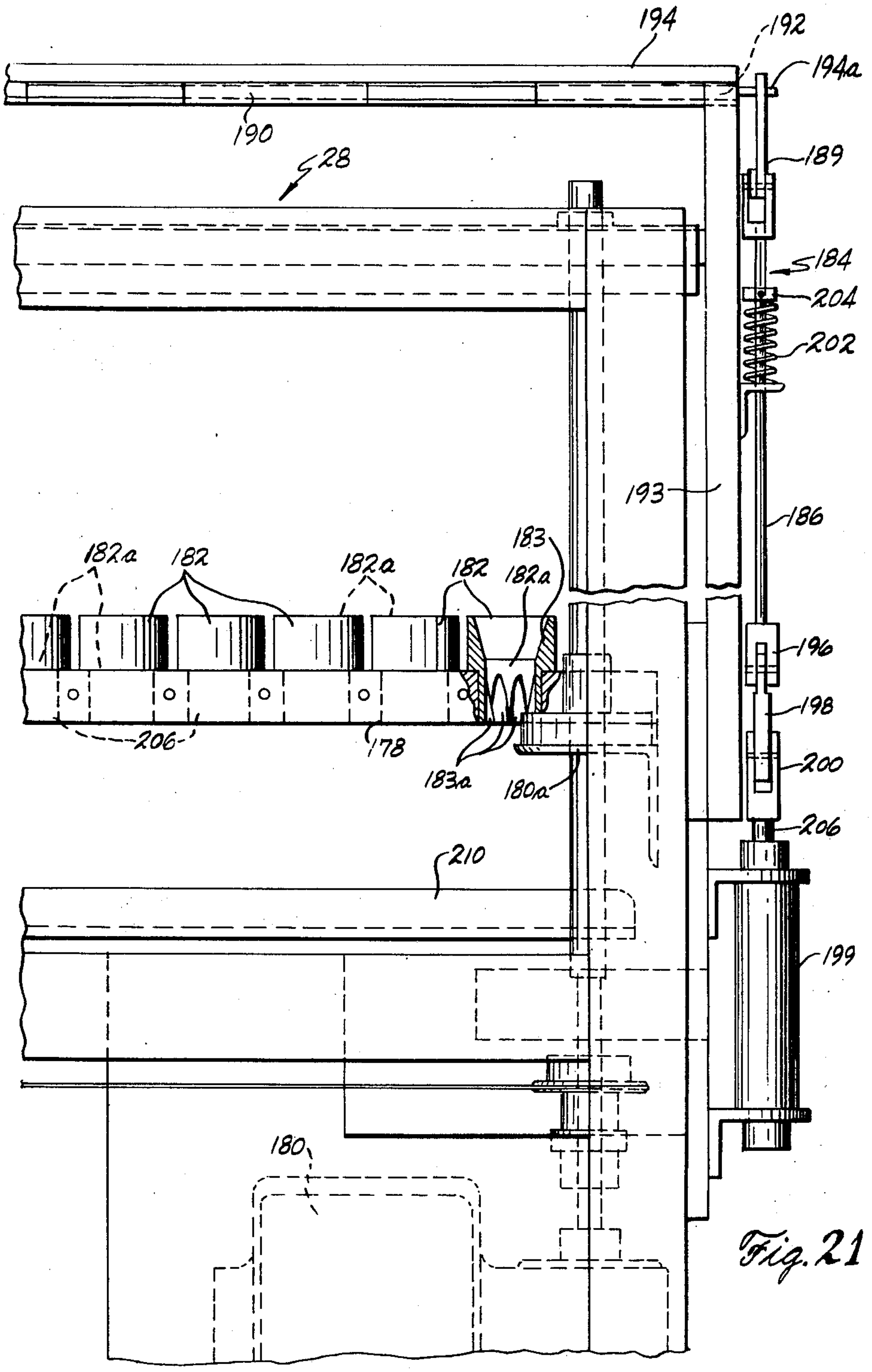
FIG. 21 illustrates a candle butt forming machine at the butt forming station, for forming the cut bases on the candles suspended from the rack.

When the clamping mechanism 184 is securely clamping the rows of suspended candles disposed therebetween, the elevator 178 with the heated base cups 182 thereon is automatically raised upwardly, thereby heat forming the butts of the candles to for instance the design shown in FIGS. 29 and 29A. The elevator after a predetermined time is then automatically lowered and the clamping mechanism 184 is deactuated, thereby causing withdrawal of the gripper members from holding coaction with the respective row of candles. As can be seen in FIG. 21, each cup 182 is open as at 206 in the bottom thereof, which drains the melted wax down to the underside of the support plate and onto a receptacle 210 which in turn catches the wax melted in formation of the candle butts. This collected wax is adapted to be returned back into the "old" wax holding tank 132*a* for reclaiming of such wax.

After release of the clamping means 182 on the butt forming station mechanism, the stop for the associated carrier rack is automatically released, and the candles with the mold formed bases are moved along overhead conveyor track section 24 to over dip station 30. The cup support plate and the associated cups 182 for forming the molded configuration on the candle bases are preferably heated to a temperature of approximately 170° F., and in any event preferably within a range of approximately 170° to 220°.

Frame 176 is preferably provided with elongated slots 212, adjustably supporting brackets 214, 214*a* by means of fasteners 216, which brackets are adapted to mount thereon limit switches (not shown) for controlling the maximum upper and lower positions of the elevator 178. Adjustment of the bracket 214, 214*a* positions provides for utilizing the mechanism with different lengths of dipped candles. Reference 220 (FIG. 22A) refers to a control valve for manually controlling actuation of fluid powered motor units 199 of the clamping mechanism 184.

Over-Dip Station. The candles produced on the mechanism of the invention are usually made from a white base material of paraffin or possibly bees wax, and at the over-dip station 30 are dipped either with a colored or with a white outer cost or layer of wax. Each carrier rack is pushed into the feeder unit 96′ of the over-dip station and the feeder automatically feeds the carrier rack into the vertical dip and lift mechanism 87′ of the over-dip station, where it is held in place by suitable stop means in a generally similar arrangement as at the dipping station 16. Upon pushing of the start button of the over-dip station controls (which are generally similar to the dipping station controls) by a machine operator, the vertical lift 87′ lowers the associated carrier rack and the candles suspended therefrom into the over-dip tank 222 of the molten wax.

The wax in the tank is preferably at about 180° F. (and in any event within a range of approximately 168° to 200° ) and the candles are maintained in dipped condition for a predetermined period of time, which can be adjusted by suitable controls including a timer TR201 (FIG. 32B), mounted adjacent the over-dip station. The vertical lift section upon running out of the timer, the lift mechanism 87′ automatically raises the carrier rack and now coated candles upwardly to slowly withdraw the candles from the melted wax. A dwell of 0–10 seconds in the tank with a withdrawal time of approximately 3–5 seconds is generally satisfactory. The feeder unit then automatically pushes the carrier rack and suspended, coated candles from the vertical lift section 87′ to the quench station 30*a* disposed next in line of the path of the overhead conveyor.

The coating placed on the candles at the over-dip station prevents dripping of the candle during the burning thereof, and in other words provides for a "non-drip" candle. This "over-dip" coating adds a layer of about 1/64 inch thick of wax to the candle, and has a higher melting temperature approximately 10°–20° greater than the melting temperature of the wax forming the inner candle body.

The over-dip station tank 222 is furnished with molten wax from a heated wax holding tank 222*a* (FIG. 1) which via a pump supplies melted wax to the over-dip tank 222. The pump is preferably a reversible pump, so that the wax can not only be furnished to the tank 222 of the over-dip station, but also can be withdrawn from the tank and placed back into the holding tank 222*a*. The reason for this is that different colors of outer layer wax may be required every so often without exhaustion of the wax in tank 222. Accordingly, the unused wax can be put back into its respective holding tank, and colored wax from another holding tank can be pumped into tank 222. In the embodiment illustrated, electrical heating means (not shown) of conventional type is utilized to maintain the wax in liquid condition for ready pumping to and from the over-dip station tank 222.

From the over-dip station, the carrier rack with the candles suspended therefrom can be moved either manually or automatically into and through a spray station or quench station 30*a* at which station the candles are subjected to a liquid spray rinse.

Quench Station. The main purpose of the quench station is to provide a shiny high luster finish to the candles, and in this connection the fluid sprayed onto the candles may include a water or other solvent soluble acrylic, resulting in a coating to the candles of a very shiny high luster finish.

Figure 24B:
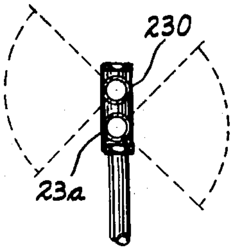
FIGS. 24, 24A are respectively side and end elevational views of a spraying station where liquid is sprayed onto a batch of candles.
Figure 24:
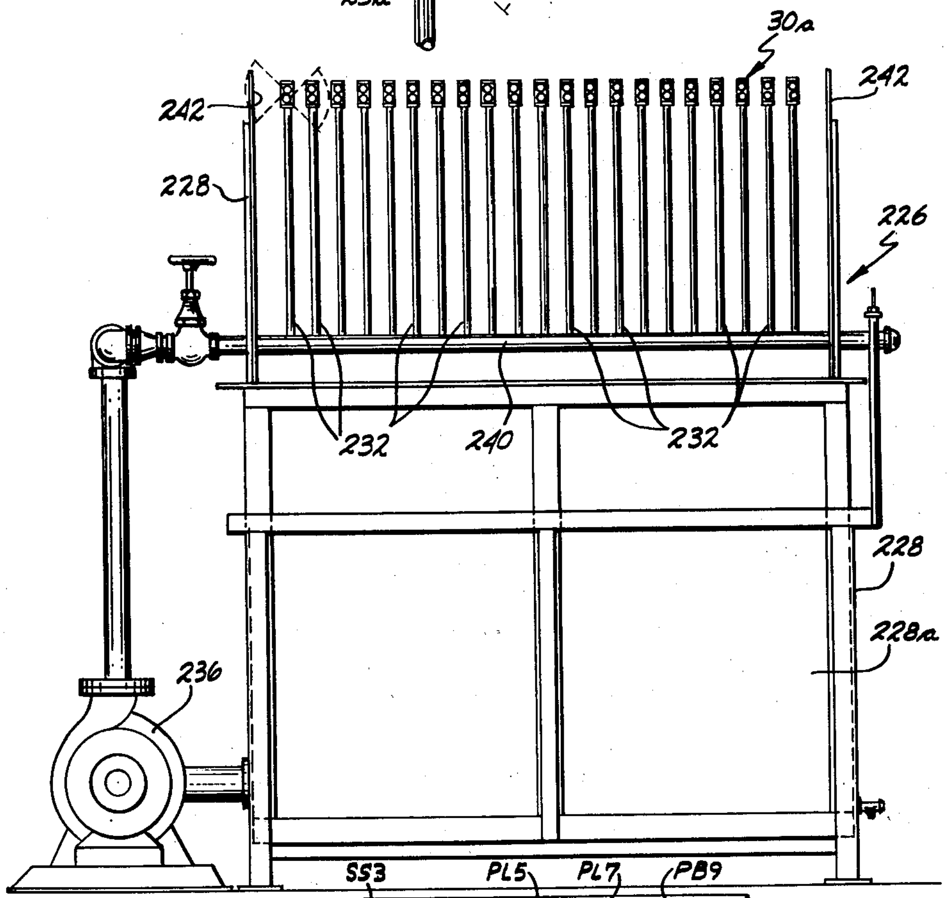
Figure 24A:
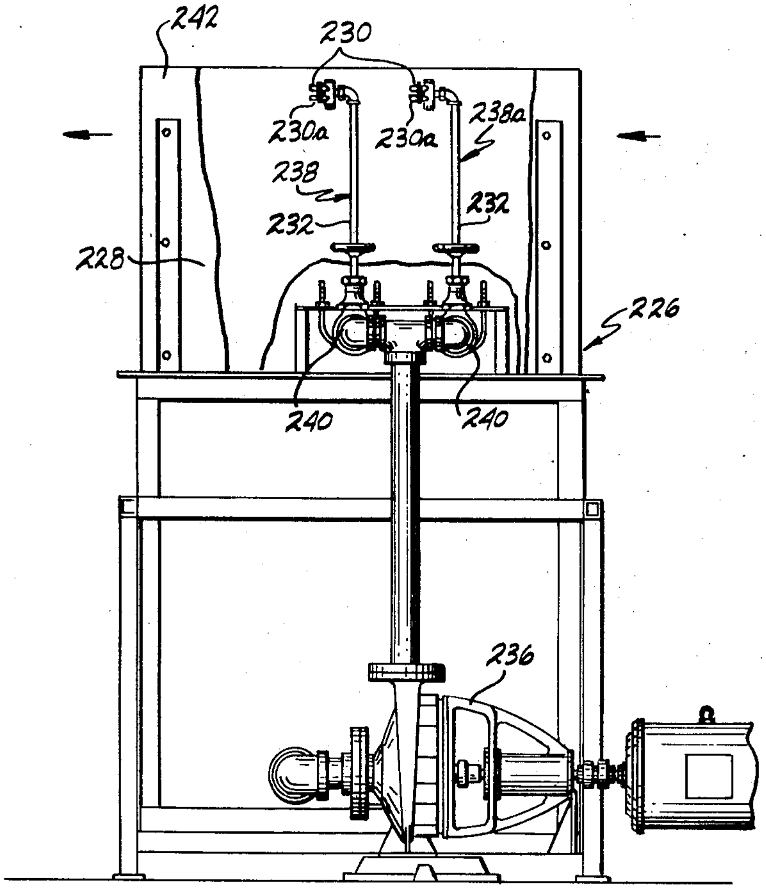

Referring now to FIGS. 24, 24A and 24B, the water or liquid spraying machine 226 comprises an enclosure 228 which is adapted to retain the spray being emitted from the spray nozzles 230, 230*a*. There are preferably provided two spray nozzles 230, 230*a* associated with each upright spray pipe 232, which nozzles spray toward the sides or laterally in a fan-like arrangement (FIG. 24B). The rows of candles hanging from a respective carrier rack are oriented between opposing rows of the spray pipes 232 (FIG. 24) and the candles are subjected to the fan-like spray emissions from the upper and lower nozzles. The top nozzle 230 of each pair sprays in one lateral direction while the bottom nozzle 230*a* sprays in the opposite lateral direction, so that all candles in the suspended rows from a respective carrier rack are effectively and completely exposed to the spray mist emitted from the spray nozzles. Preferably forward and rearward sets 238, 238*a* of nozzles are provided.

The liquid of the spray drips down from the candles into the enclosed bottom section 228*a* of the housing 228 and is then pumped back up through via an electrical powered pump 236 into the main spray pipes 240 and thence to respective upright pipes 232 and out through the nozzles 230, 230*a* once more.

The side panels 242 on the quench station enclosure aid in retaining or restricting splashing of the spraying liquid, and facilitate the recovery of the sprayed liquid and its reuse at the quenching station.

From the quenching station 30*a*, the carrier racks move manually (or automatically) to the cut-down station 36 where the rows of candles are adapted to be cut down sequentially and positioned for packaging at the packaging station 40.

CUT DOWN STATION

Figure 25:
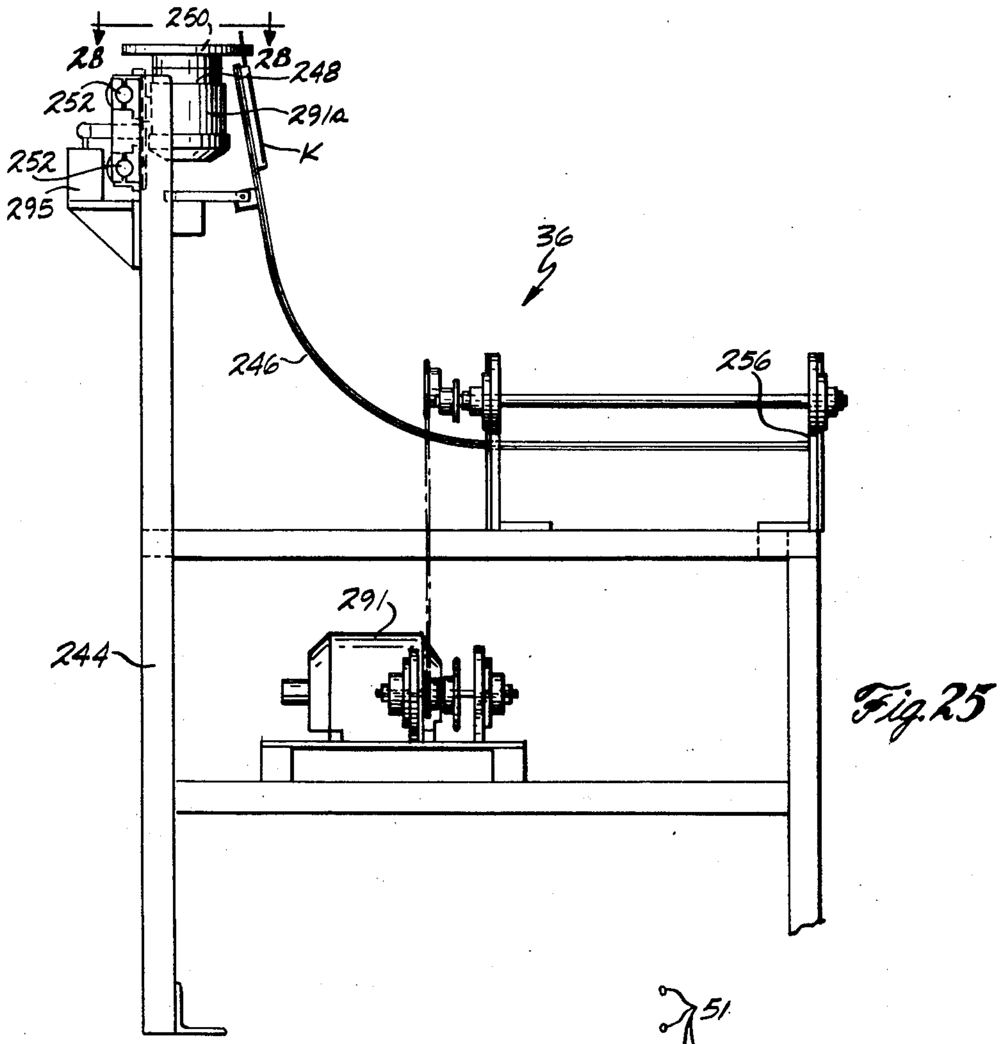
FIG. 25 is a side elevational view of the cut down station where rows of the candles suspended from a rack are sequentially cut down and collected.
Figure 26:
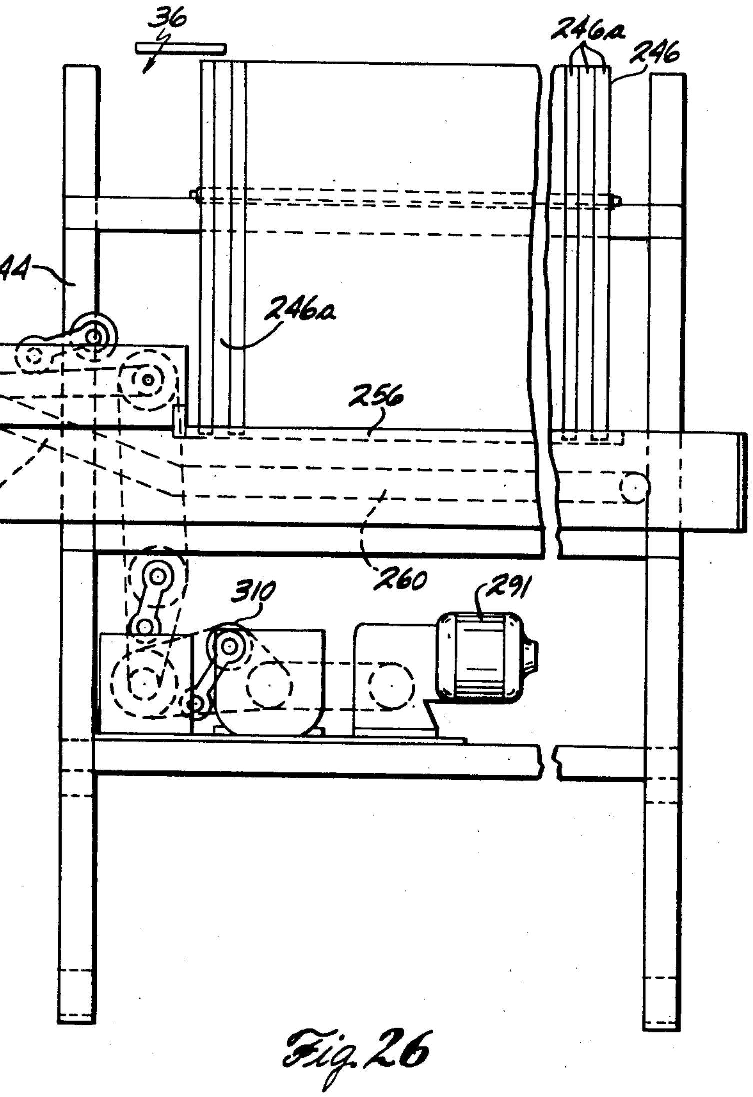
FIG. 26 is a broken end elevational view of the cut down station machine illustrated in FIG. 25.

Referring to FIGS. 25 and 26, the cut-down station comprises a frame 244 including a chute 246 which includes multiple passageways or troughs 246*a* (FIG. 26) for every position of the row of candles as suspended from the respective carrier rack, for receiving each respective candle as it is cut down from the carrier rack by means of a power operated cutter 248 which is adapted to move longitudinally when the first row of candles in a respective carrier rack is positioned so as to be in aligned engagement with the passageways or troughs 246*a* at the cut-down station.

The cutter 248 comprises a circular knife or cutter member 250 which is electrical power operated, and which moves longitudinally on tracks 252, so as to engage the wicks of the suspended candles, and sever the wicks from their anchored relationship with respect to the respective carrier rack. As each of the wicks is severed, the respective candle drops by gravity, and the respective trough of the chute 246 guides the associated candle as it moves down to an abutment stop 256 located at the base of the chute 246. Upon severing of a complete row of the candles from the respective carrier rack, the cutter 248 automatically moves back to its original or beginning position, and the carrier rack is automatically indexed forwardly as by means of a power unit similar to aforedescribed unit 96, and into a position whereupon the next row of candles is located so that their wicks are engageable by the cutter 248 as it moves longitudinally on its tracks 252 and transverse of the carrier rack. Thereupon the cutter automatically again moves longitudinally and and another row of candles are automatically cut down from the respective carrier rack to be guided in its respective trough 246*a* down to the aforementioned abutment stop 256.

The candles with their bottom ends disposed against the abutment stop 256 are located on an apertured horizontally slidable support plate 258 actuated by a motor unit 258*a*, which upon actuation of the motor unit, removes the underlying support from the candles permitting them to drop down by gravity through the openings in the plate onto an underlying conveyor 260 associated with the cut-down station.

Motor unit 258*a* is preferably actuated automatically by a sensor (not shown) which is associated with the last trough of the chute member 246 of the cut-down station, so that when the last candle from a respective row of candles hits the abutment stop 256, it (the candles) actuates the sensor which causes powered actuation of the motor unit 258*a* controlling the support plate 258. Thereupon all of the candles resting against the abutment stop fall downwardly by gravity onto the conveyor 260.

The conveyor 260 is preferably automatically actuated so as to move the candles from beneath the support plate and thence upwardly via inclined conveyor portion 262 onto an automatic wrapping machine 40 of the system. Conveyor 260 is preferably an endless chain conveyor having roller support surfaces of conventional type.

Meanwhile, the aforementioned motor unit 258*a* has been reactuated thereby automatically returning the support plate portion 258 back to its original position, ready to once again support a row of candles cut down by the cutter 250. The candles on conveyor 260 meanwhile move automatically along the conveyor and drop one by one onto the wrapping machine 40 where they are automatically wrapped and imprinted with any desired information on the exterior wrap for the candles. The wrapping machine then automatically moves the candles by conveyor means or the like into boxes. The wrapping mechanism 40 may be of a known type called a Hayssen R T Candle Wrapper. Such packaging machine is a continuously operating mechanism which will continuously package candles and deposit them in a receptacle for shipment from that location.

Referring now to FIGS. 32, 32*a*, 32*b* and 33, there is illustrated schematically and diagrammatically, electrical and air components in a control system for power operation of the candle manufacturing system in the dipping loop portion 20 of the power conveyor system and at the overdip station 30. Automatic operation at the cut-down station 36 will hereinafter be described. The other mechanism stations in the candle manufacturing system may be generally manually controlled at the respective station.

Figure 33:
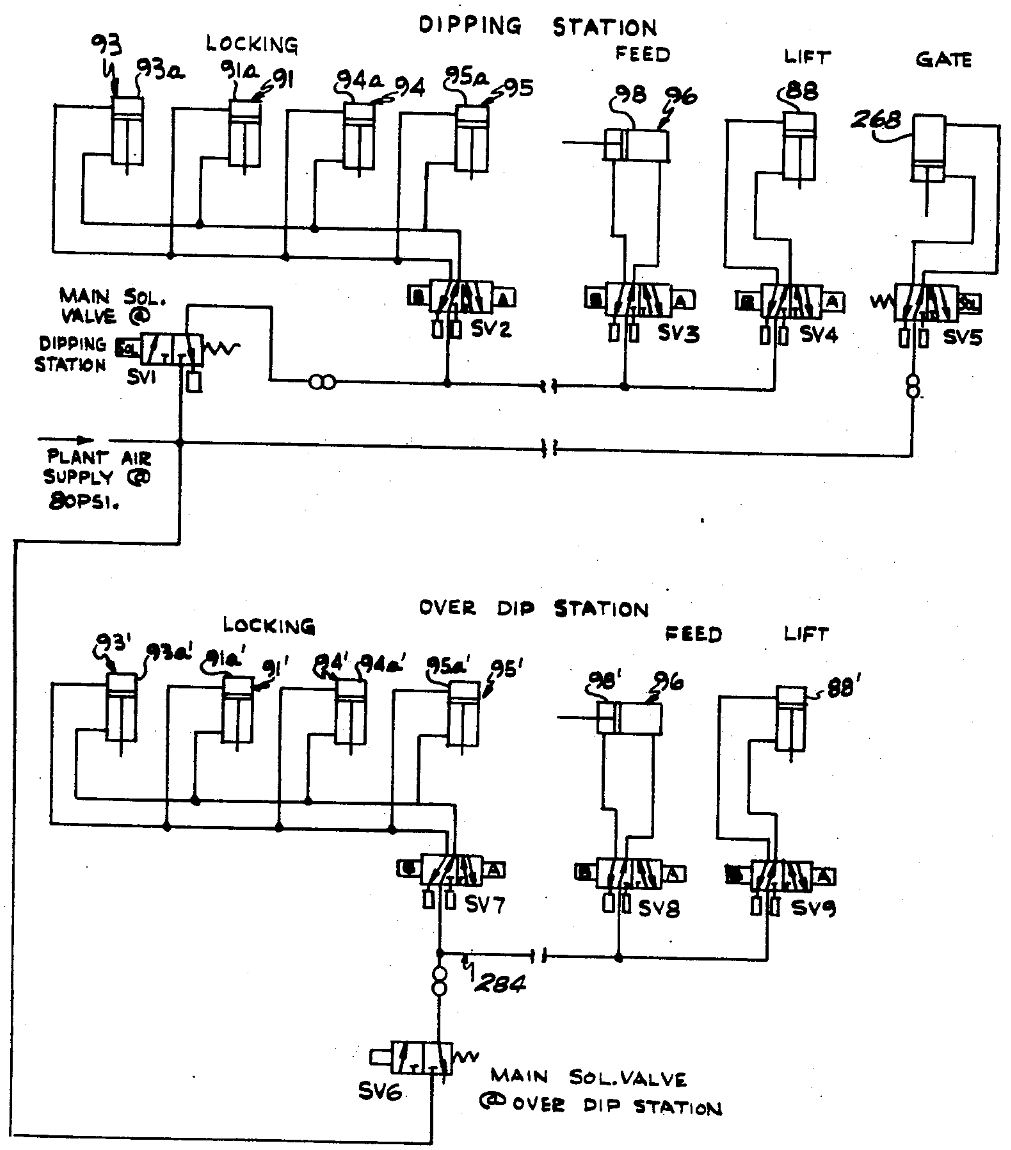
FIG. 33 is a schematic of the pneumatic control system components at the dipping and at the over-dip stations.

FIG. 33, illustrates the air actuated reciprocal motor units and the associated valving, for connecting the locking or holding mechanisms 91, 93, 94 and 95 which hold the respective carrier rack 12 in a predetermined position with respect to the overhead conveyor track 10. One position is the location of stop or lock mechanism 91 (FIG. 12) which positions the respective carrier rack prior to its being moved onto track section 87 of the lift at the dipping station. The other positions controlled by motor units 91*a*, 94*a* and 95*a* are those positioning the carrier rack at the dipping station 16 and after the carrier rack is released from the dipping station and moves outwardly to the two locations 120, 120*a* (FIG. 1) at the air cooling station. As can be seen, the locking, feeding and lift mechanisms at respectively the dipping station 16, and at the overdip station 30, are coordinated, and that motor unit 268 (FIG. 33) controlled by solenoid valve SV5 and associated photocell PC2, and limit switches LS9, LS10 and LS11 (FIG. 32A) operates a gate 270 (FIG. 1) for preventing more than one carrier rack at a time traversing the corner 272 of the dipping loop portion 20 of the conveyor system and for limiting the backup of the carrier racks directly in front of the dip station.

In the dipping loop portion, the carrier racks are automatically moved by an endless overhead conveyor chain 273 (FIG. 12A) which includes depending dogs 273*a*, which are adapted to coact with notched section 274 (FIG. 8) of a trolley 44 of a respective carrier rack, to move the latter with the moving chain. Aforementioned air motor unit 268, prevents the latter coaction and holds up the associated carrier rack at gate 270 when so instructed to do so by photocell sensor PC2. The conveyor chain is actuated or moved by electric motor M1 (FIGS. 1 and 32) with the chain dogs automatically disconnecting from the respective carrier rack when the latter is positioned in front of the dipping station, for movement into the latter by means of aforementioned double acting air motor 98 of power feed system unit 96 (FIG. 33). Such endless chain continuously movable, overhead conveyor mechanism is a commercially available, known unit.

Figure 32:
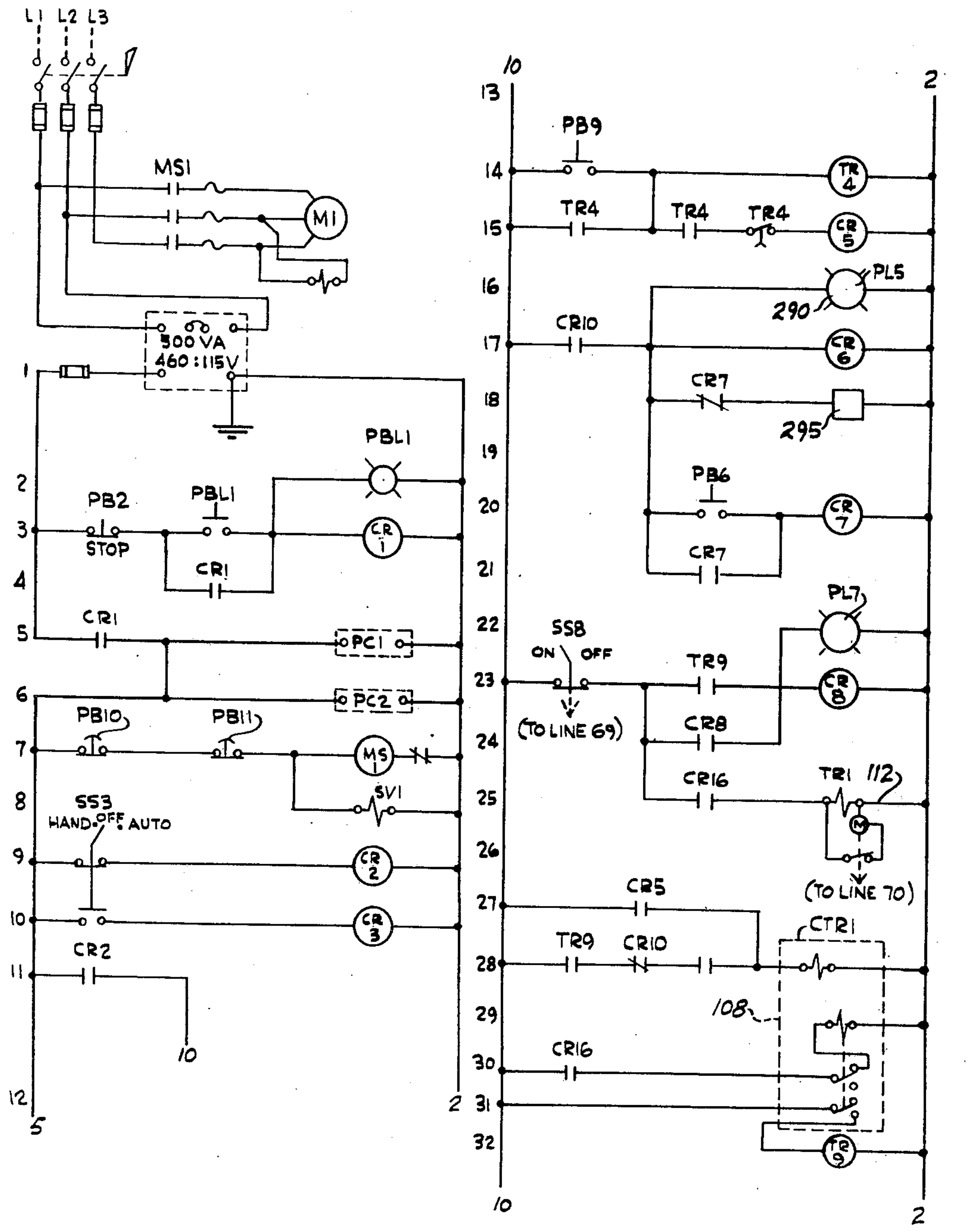
FIGS. 32, 32A and 32B are schematics of the electrical controls for controlling the dipping and over-dip operations.
Figure 32A:
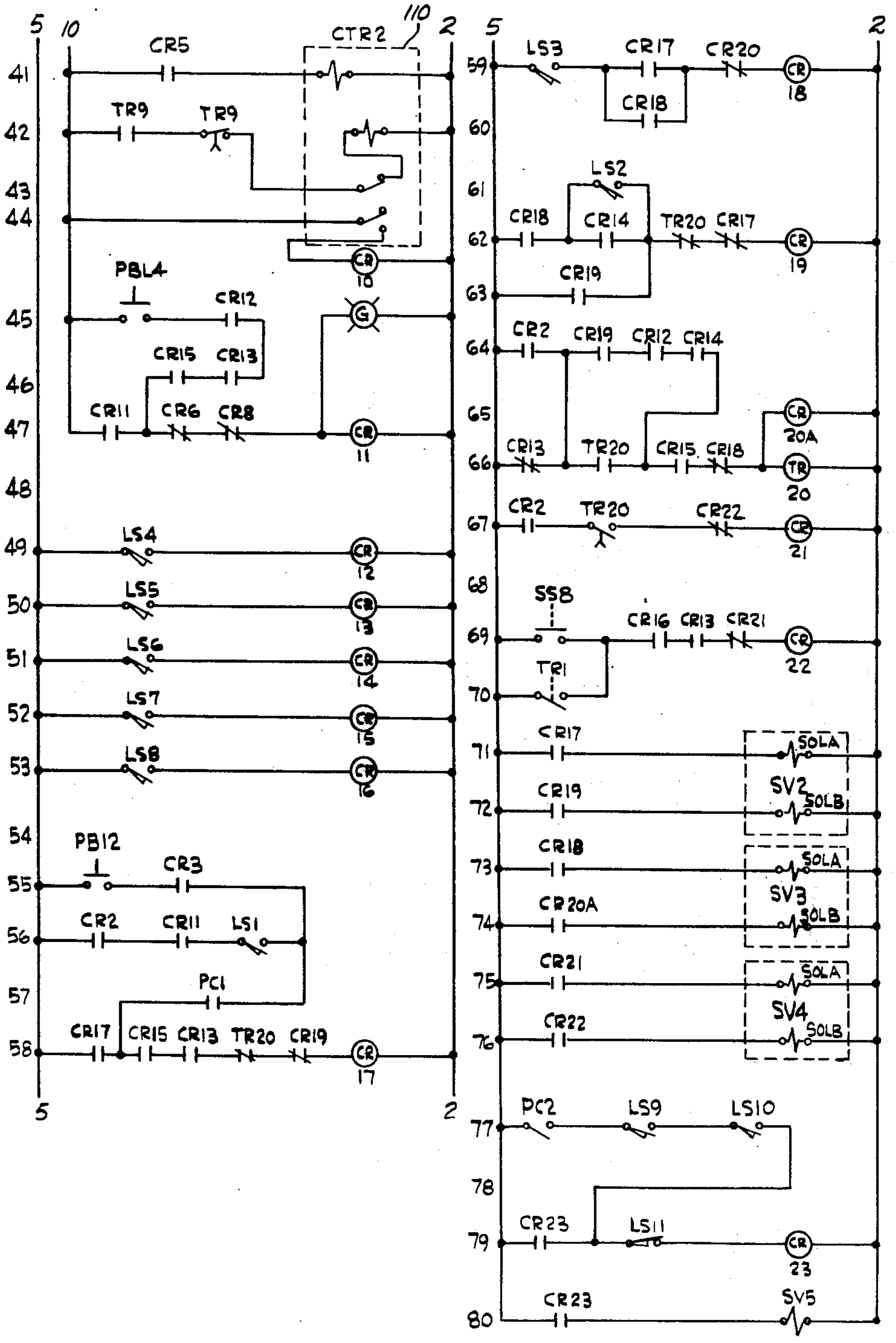

To start the system, a selected number of carrier racks having the aforedescribed tensioned wicks thereon as provided at wicking station 14, are fed into the dipping loop section 20 of the overhead conveyour, as by manually pushing the racks from the conveyor section 10*a* through track frog 19 into the dipping loop section, whereupon the racks are accummulated in front of the dipping station 16, and held by aforedescribed stop 93. Hand rails 278 on the racks facilitate the manual movement of the carrier racks. The preferred number of carrier racks is approximately 20 in the illustrated embodiment, but less or more than 20 can be provided if so desired. Master start switch PBL1 (FIGS. 14 and 32), controls energization of relay CR1 and motor starter relay MS1, thereby closing contacts MS1, and energizing the electric motor M. (FIG. 32). Electric motor M1 is operatively coupled to and powers the aforementioned chain conveyor 273 running on its guide track on the overhead conveyor system.

The endless power chain system is adapted to pick up the racks as aforedescribed and to move them to a location in front of the dipping station where they are stopped by engagement with the next prior rack. Photocell sensor PC2 controls gate 270, as aforementioned to limit the carrier racks stacked up ahead of the dipping station. Next on the control panel 106 (FIG. 14) preferably located in the vicinity of the dipping station, an operator sets counter 108 (CTR1) for the number of carrier racks in a particular batch, usually 20 as aforementioned, and will also set counter 110 (CTR2) for the number of dipping cycles per rack (usually approximately 25) that may be required to provide a particular candle size or diameter of candle. Counters 108 and 110 are adjustable to whatever selected number of carrier racks in a particular batch and the number of dipping cycles for the batch. By using control 112 (TR1) the operator can also program into the control a selected "soak period" for the first dip of each carrier rack, so that the wicks, as initially dipped into the vat or tank of liquid wax at the dipping station, will be properly soaked with wax, making a more effective burning of the candles. This initial "dwell" or soak period is preferably about 3 seconds longer than the remainder of each dipping cycle. As can be seen, control switch SS8 on the control panel 106 turns the dwell cycle on and off and when "on" causes energization of dwell timer TR1, contact CR16 being adapted to be closed by lowering of the dipping mechanism 88 which in turn closes limit switch LS8 to energize relay CR16. A light P67, FIGS. 14 and 32 comes on to indicate completion of the dwell cycle. When the selector switch SS3 (FIGS. 14 and 32) is turned to automatic cycle and the start button PBL4 is pushed (line 45, FIG. 32A) the latter will cause activation of the dipping or lift mechanism 88, relays CR12, CR13 and CR15 having been energized due to the closing of limit switches LS4, LS5 and LS7 by the lock mechanisms 91–95 in closed position, the feeder mechanism 96 in its "home position," and the lift mechanism in its raised position, respectively.

With the selector switch SS3 (FIGS. 14 and 32) moved to "automatic" position, pushing of the lift start button PBL4 (FIG. 32A, line 45) causes energization of relay CR11 and energization of relay CR17 (relay CR-2 having been previously energized upon energization of relay CR1) thereby resulting in energization of solenoid A of solenoid valve SV2 to activate the air motor units *93a*, *91a*, *94a* and *95a*, to thus unlock the locking mechanisms 93, 91, 94 and 95. Main solenoid valve SV1 was previously activated upon activation of the motor starter relay MS1.

The feeder motor unit 98 will be automatically extended due to energization of relay CR18, and thus energization of solenoid A of solenoid valve SV3, which will automatically load a carrier rack from the hold position at stop 93 just prior to the vertical lift at the dipping station, and will simultaneously unload a carrier rack at the dipping station (if the lift is occupied by a carrier rack). The lift will then immediately lower due to energization of relay CR21, and thus activation of the solenoid A of solenoid valve SV4 controlling the lift motor unit 88, which will lower the carrier rack and tensioned wicks thereon into the underlying tank of liquid wax. Lowering of the lift and associated conveyor track section 87 causes limit switch LS8 to close, energizing relay CR16.

The lift will then raise back up, removing the tensioned wicks from the tank of liquid wax upon energization of relay CR22 to once again activate solenoid B of solenoid valve SV4.

When the aforementioned locking mechanism is opened as activated by solenoid valve SV2, limit switch LS3 closes and when the feeder unit 98 is fully extended, limit switch LS6 closes energizing relay CR14. When the lift raises to its starting position, limit switch LS7 is closed to cause energization of relay CR15, and when the lift is lowered to its lowermost position, as aforementioned, limit switch LS8 closes to energize relay CR16.

The carrier rack that has been moved out of the dipping station 16 by the feed mechanism 96, will dwell for approximately the time of one cycle (usually about 9 seconds) over the air exit opening 120 (FIGS. 1 and 17) where the wax on the wicks will be cooled, and then the carrier rack will be indexed again by feed unit 96, so that the rack dwells for another cycle time over the air exit opening *120a*, as aforedescribed, so that there are two "hold" positions after the dipping of the carrier racks at the dipping station.

Thereafter, the racks are automatically picked up by the conveyor chain and moved to gate 270 for movement again to the dipping station for repeating the dip cycle. Limit switch LS1 (FIG. 32A, line 56) is activated when a carrier rack is present and photoelectric sensor PC1 senses such carrier rack to cause energization of relay CR17 which controls as aforementioned opening of the locking mechanism 90, 93, 94 and 95. Limit switch LS2 is activated when an associated carrier rack is clear of the aforementioned locking mechanism, to permit energization of control relay CR19 which in turn causes activation of solenoid B of solenoid valve SV2, to cause closing of the locking mechanism.

Limit switch LS9 is activated when a carrier rack is present at the gate 270, and limit switch LS10 is activated when a drive dog on the conveyor chain is present at the gate; limit switch LS11 remains closed, so long as a carrier rack is not obstructing the gate, and is activated when a carrier rack is not completely clear of the gate, and therefore senses the corner portion of the conveyor track. When the corner is clear of a carrier rack, the normally closed limit switch LS11 remains closed, and thereby permits energization of relay CR23 which causes energization of solenoid valve SV5 to cause actuation of gate air unit 268 and thus opening of the gate, and therefore movement, by the conveyor chain, of a further carrier rack toward the dipping station.

As each candle ladened carrier rack is moved from the vertical lift by means of the feed power unit 96, the relays CR9 and CR15 are energized, which causes a decrease in the batch counter 108 (CTR1) of one and simultaneously the cycle counter 110 (CTR2) will be decreased by one, thus keeping track of the number of dips that each carrier rack is subjected to, together with the number of times that the dipping occurs for the selected number of carrier racks in the batch. Upon completion of counting by the cycle counter, relay CR10 is energized thereby closing contact CR10 in line 17—FIG. 32,—which causes energization of an alarm horn AH, together with energization of the light PL5 indicating that the batch cycle has been completed. The operator may press alarm silence button PB6 which energizes relay CR7, thereby opening normally closed contacts CR7 in line 18, to turn off the alarm.

Thereafter the operator can actuate master stop switch PB2 (FIGS. 32 and 14) to deenergize relay CR1, thus stopping the conveyor drive motor M1, and signaling the completion of the dipping sequence.

After the selected batch of carrier racks with the tapered candles formed thereon has been processed to the operator's satisfaction, as above described, he can turn the selector switch SS3 from automatic to manual, and upon actuation of pushbutton PB12 (line 55, FIG. 32A), the carrier racks are permitted to cycle through the vertical lift 87 at the dipping station without the lift being lowered, so that the total batch of finished candles suspended from their respective carrier rack can be fed out of loop portion 20 into conveyor section 24 which is non powered. In this connection, frog 23 can be manually thrown to switch the trolleys of the carrier racks from power loop section 20 onto free conveyor section 24, preparatory to manually moving such carrier racks with their load of candles toward the base cut-off station 26.

At the overdip station 30, which again is a dipping operation station, (referring again to FIG. 33) the locking mechanism 93', 91', 94' and 95' are generally similar to that at the dipping station 16, with the feeder mechanism 96' and the lift motor unit 88' being coupled in coordination with the gate motor units 93*a'*, 91*a'*, 94*a'* and 95*a'*, all being coupled into the air line 284 by a respective solenoid valve SV7, SV8 and SV9. The operation of the locking mechanism and the feed, and the lift mechanisms at the overdip station is generally similar to that aforedescribed at the dipping station 16.

Figure 32B:
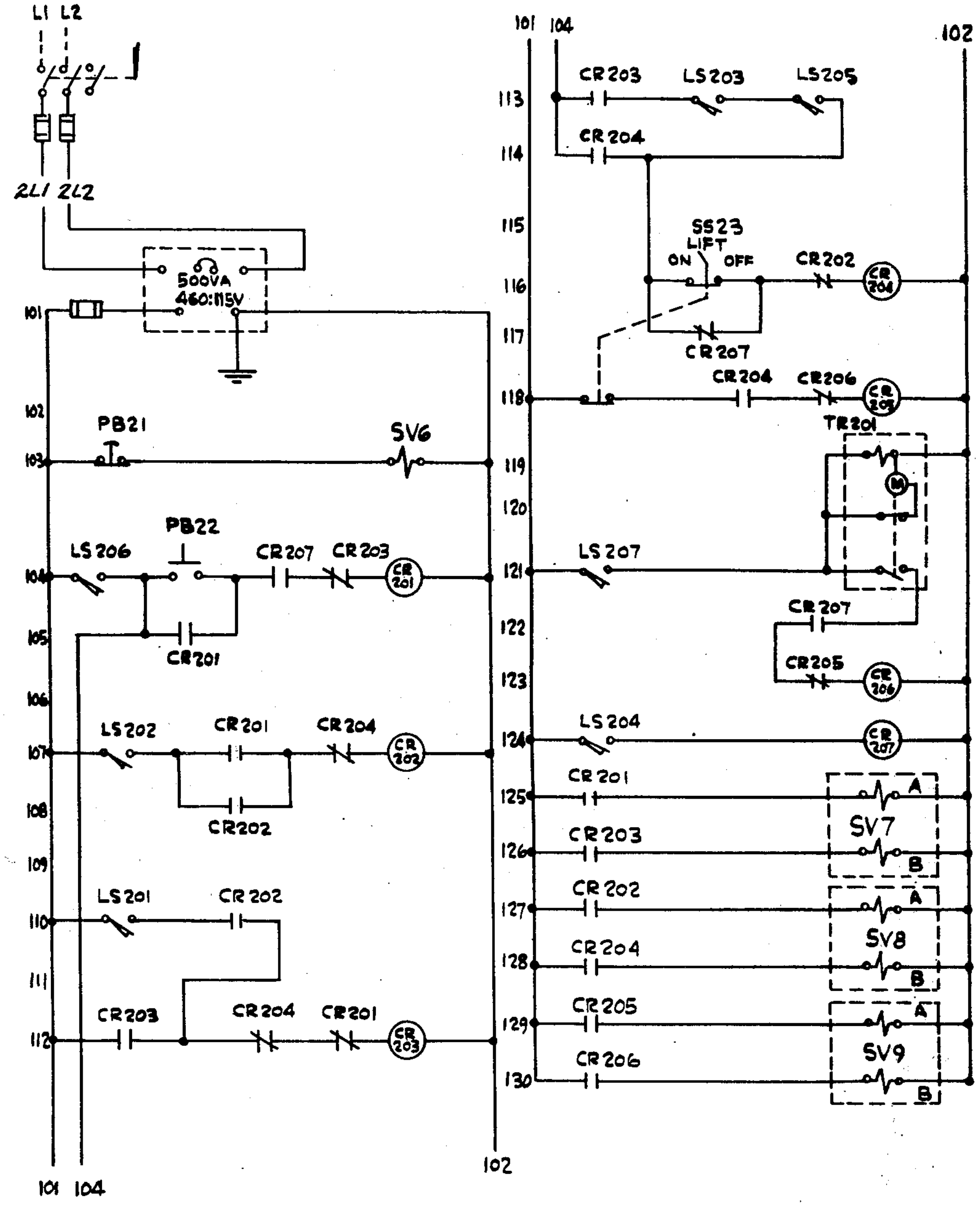

Referring now to FIG. 32B, pushbutton PB22 initiates the overdip cycle, which causes energization of relay CR201, thus permitting energization of relay CR202. Energization of relay CR201 causes solenoid valve SV7 to be actuated to open the locking mechanism, thereby freeing the carrier racks on the conveyor system at the overdip station. Opening of the locking mechanism, causes limit switch LS202 (line 07) to close, which as aforementioned permits energization of relay CR202, permitting actuation of solenoid valve SV8 for actuating the feed power unit 96', and specifically the air motor unit 98' thereof, thereby moving a carrier rack from a position in front of the overdip lift 87' onto the lift mechanism.

When the load carrier clears the lock, limit switch LS201 (line 10) closes which energizes relays 203 to actuate solenoid B of solenoid valve 7, to close the locking mechanism. The extension of the feeder mechanism 98' causes closing of limit switch LS205, which causes energization of relay CR204 which causes return of the feeder motor unit due to energization of relay CR204 and activation of solenoid B of valve SV8, thereby causing the feed motor unit 98' to return to its starting or "home" position. Meanwhile relay CR205 is energized upon energization of relay CR204, which causes the lift 87' to lower by actuating solenoid A of solenoid valve SV9.

When the feed motor unit 98 has returned to its "home" position, limit switch LS204 (line 24) is closed by such movement and when the lift reaches its lowered position, limit switch LS207 (line 21) is closed which causes activation of relay CR206 which in turn activates solenoid B of solenoid valve SV9 to cause raising of the lift and withdrawal of the candles from the overdip tank 222.

Timer relay TR201 is provided, which is adjustable from for instance 0 to 60 seconds, for varying the "dwell" of the lift mechanism in its lowered condition in the bath of liquid overcoat wax material as heretofore discussed.

Upon raising of the lift mechanism out of the overdip tank of liquid wax, the limit switch LS206 (line 04) is closed. The locking mechanism 91', 93', 94' and 95' is open due to energization of relay CR201, and the feed mechanism 96' automatically pushes the candle rack that is disposed in the raised lift into the spraying station. If there is already a carrier rack in the spraying station, such movement of the first-metnioned rack automatically pushes the forward rack out of the spraying station area. Upon exiting from the spraying station, the carrier racks with the candles thereon may then be manually moved toward cut-down station 36.

Figure 31:
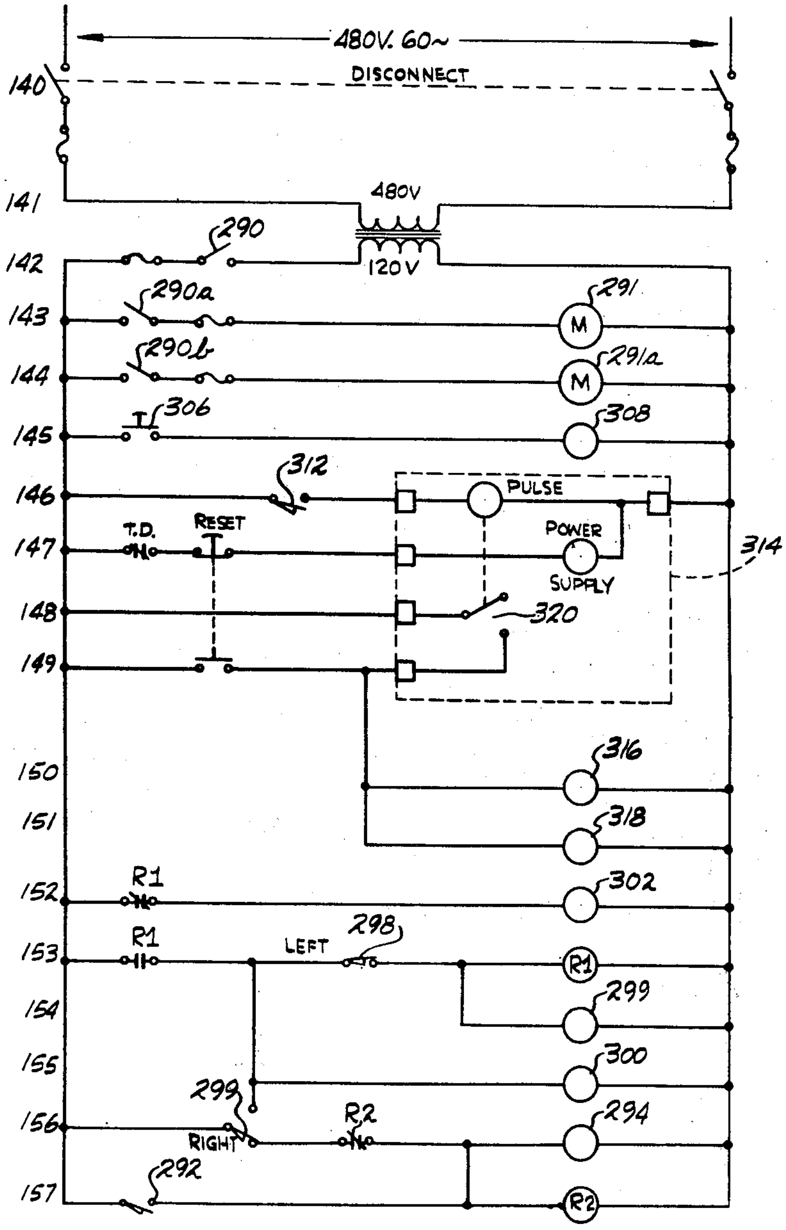
FIG. 31 is a schematic of the controls at the aforementioned cut-down station.

Referring now to FIG. 31, the operator at the cut-down station 36 may close switch 290, 290*a* and 290*b* to activate the electric motors 291 and 291*a* of respectively the conveyor 260 and the cutting unit 248. Accordingly, the motors for these units are continuously running as controlled by the manual switches 290*a* and 290*b*.

The normally open, gate limit switch 292 is adapted to be closed by a load carrier on the overhead conveyor, properly positioned at the cut-down staion. The gate may include a locking mechanism of the general type aforedescribed in conjunction with the dipping and over-dip stations, and which locking mechanism is deactivated when the carrier rack is properly positioned at the cut-down station. Closing of aforementioned switch 290 causes actuation of a relay 294 which controls a solenoid valve (not shown) which controls an air motor unit 295 (FIG. 25) which drives the cutter unit 248 on its guides to 252 and causes the cutter unit to be moved transversely on the tracks or guide rails 252, thereby causing the rotating cutter blade 250 to engage the in-line wicks of the suspended candles and sever the row of candles from anchored suspended relationship on the respective carrier rack.

The severed candles then drop by gravity and are guided in the respective trough of chute 246, whereupon the candles are stopped at the aforementioned abutment stop 256 located at the base of the chute 246.

When the cutter unit 248 reaches the right hand side of the cut-down machine, such cutter unit causes tripping of limit switch 297 which activates the relay R1 via left hand, normally closed, limit switch 298, as well as activating relay 299, the latter controlling reversal of the air motor unit 295, to cause movement of the cutter unit back toward its "home" or left hand position.

Tripping of limit switch 297 also activates relay 300 which controls the solenoid valve controlling the feed motor unit of the feed unit which feed unit automatically moves or indexes the carrier rack backwardly and forwardly to cause forward indexing of the carrier rack and presentation of another row of the candles suspended from the carrier rack in proper position for engagement by the rotating cutter blade 250 on the next transverse pass of the cutter unit 248. The latter mentioned feed unit may be generally similar to aforediscussed feed unit 96 except that the increments of movement will be smaller of course. Energization of relay 300 causes predetermined backward movement of the feed unit dogs (e.g. 100) so that they will be behind the abutment bar 92 on the respective carrier rack, and when the cutter unit 248 arrives at its "home" or left hand position, it causes opening of limit switch 298 to deenergize relay R1 and thereby cause energization of relay 302 which controls the forward movement or indexing of the feed unit, to forwardly index the carrier rack.

Figure 27:
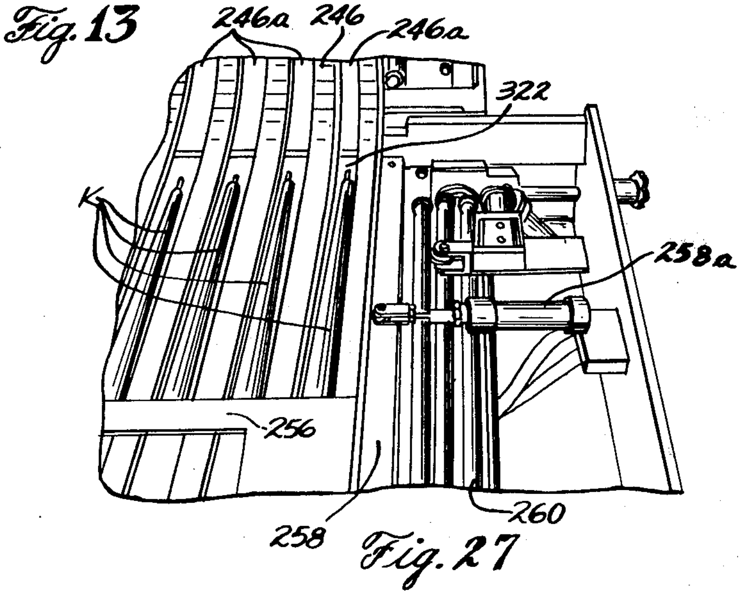
FIG. 27 is a fragmentary, perspective view of a trap means for gravity transfer of the candles from the cut-down machine to a conveyor mechanism illustrated to transport the candles to a wrapping station.
Figure 28:
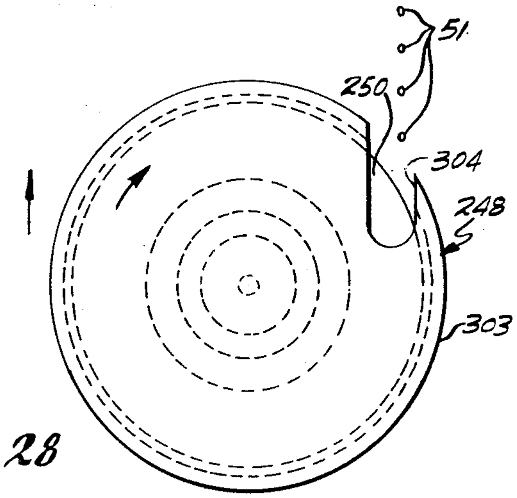
FIG. 28 is an enlarged top plan view of the cutter for the cut-down station taken generally along line 28—28 of FIG. 25.

It will be noted that the housing 303 which encompasses the cutter blade has a hook shaped recess 304 therein in its side facing the rows of candles (FIG. 28) which facilitates the feeding of the wicks into engagement with the rotating cutter blade 250, as the cutter unit moves transversely of the respective carrier rack. When the last of the 20 candles in a particular row as cut down from the respective carrier rack slides down its respective chute and hits the stop 256, it activates a switch 306 which causes energization of relay 308 which causes activation of intermittent drive unit 310 coupled to energized motor 291 of the conveyor 260, thereby causing intermittent movement of conveyor, and resultant intermittent movement of candles on the conveyor toward the packaging station. Activation of the intermittent drive, causes intermittent activation of switch 312 which energizes counter unit 314, which in turn activates time delay relay 316 and gate relay 318 via pulse input switch 320 in the counter. Energization of relay 318 causes activation of a solenoid valve to cause inward movement of the piston rod of air motor unit 258*a* (FIG. 27) which in turn moves the trap plate 322 rearwardly to expose the elongated openings therein through which the candles K drop by gravity onto the underlying intermittently driven roller conveyor 260. After a predetermined time, the piston rod of air unit 258*a* is extended to cause covering of the openings in plate 322, ready for receiving another row of cut-down candles.

The intermediate drive unit 310 is a clutching mechanism of known type which is driven by the electric motor 291 and which is clutched to the conveyor 260 intermittently. Thus the conveyor 260 is clutched into coordination with the number of candles being processed at the cut-down station, and the latter are automatically fed to the wrapping machine 40 at a controlled rate. The wrapping machine as aforementioned may be a Hayssen wrapper with an attached printer and may be of known construction. After all 20 rows of candles have been severed from the respective carrier rack, the latter may be moved manually from the cut down station 36 forwardly into the storage area 40 of the overhead conveyor track, for reentry into the wicking station 14 to once again start the cycle over.

From the foregoing description and accompanying drawings, it will be seen that the invention provides a novel system for the production of dipped candles which includes overhead supported mobile carrier racks for formation of the candles in suspended relation from the respective rack and which comprises a wicking station for providing rows of candle wicks in generally tensioned, suspended relation from a respective carrier rack, a dipping station for automatically dipping the wicks on the rack through a predetermined number of dipping cycles, a base cut-off station for cutting off the wick weights and bases of the candles suspended from the rack, a butt forming station for forming the butts of the candle into a desired configuration, and a cut-down station for cutting down rows of the candles formed on the candle wicks and for collecting the same for further processing. The invention also provides a novel method for producing generally uniform tapered candles in a mass production system.

The terms and expressions which have been used have been used as terms of description, and not of limitation, and there is no intention in the use of such terms and expressions of excluding any equivalents of any of the features shown or described, or portions thereof, and it is recognized that various modifications are possible within the scope of the invention claimed.

What is claimed is:

1. In a system for the production of dipped taper candles including a mobile carrier rack suspended from an overhead conveyor system, a wicking station for providing candle wicks and for attaching the latter in generally tensioned suspended relation to said rack, a dipping station including a tank for automatically dipping the wicks on said rack through a predetermined number of dipping cycles, for forming candles on the wicks, a cut-off station for cutting off the bases of the candles suspended from said rack, the last mentioned station including means for clamping the candles during the cutoff operation, a butt forming station for forming the cut butts on candles suspended from said rack, said butt forming station including means for holding the candles in generally stationary relation to the rack during said butt forming operation, and a cut down station for cutting down the candles from said rack.

2. A system in accordance with claim 1 including means for transferring cut down candles from said cut down station to a packaging station including mechanism for automatic packaging of the candles.

3. A system in accordance with claim 1 wherein said wicking station includes means for suspending spaced strands of filament material and clamping the same at opposite ends thereof, together with weight means for subjecting the strands of filament material to tension force when the held ends are moved with an associated of said weight means onto said rack.

4. A system in accordance with claim 1 wherein said dipping station includes fluid powered motor unit, the conveyor system including an overhead track for movably supporting the movable racks thereon, said track including a separable section secured to said motor unit and which is adapted to be lowered and raised with respect to the remainder of the track upon predetermined actuation of said motor unit, a dipping tank disposed beneath said separable section adapted to contain liquid wax for formation of the candles on the wicks upon performance of said dipping cycles, and a holding tank operably coupled to said dipping tank for providing for flow of liquid wax from said holding tank to said dipping tank.

5. A system in accordance with claim 1 wherein said dipping station includes control means for selectively determining the dipping cycles per rack.

6. A system in accordance with claim 1 wherein said butt forming station comprises a plurality of candle base forming recess means on a support including means for heating said recess means, and means for raising and lowering said support for said recess means to cause engagement of the latter with the bottom portions of candles adapted to be rigidly suspended from an associated carrier rack, to heat form the candle bases, said holding means at said butt forming station, comprising grippers adapted to grasp the upper end sections of the candles during said butt forming operation.

7. A cut-down machine for cutting down candles in suspended condition on an overhead carrier rack in the system of claim 1 comprising, a plurality of sloping troughs to which the carrier rack is adapted to be positioned in generally adjacent relation, a cutter means mounted adjacent the upper end of said troughs, for movement in a generally horizontal plane transverse of said troughs, said cutter means including means adapted to engage the exposed candle wicks and to sever the wicks sequentially in one row of the candles at a time, with the candles being adapted to move by gravity down the respective trough, and abutment means at the lower extremity of said troughs for positioning of the candles.

8. A candle dipping machine for use at said dipping station in the system of claim 1, said machine comprising a dipping tank, the overhead track of said conveyor system being sectionalized so that a portion thereof is movable relative to the remainder of the conveyor track, reciprocal motor unit means for lowering and raising said track portion, means coacting with said track portion for locking a carrier rack thereto, and control means for controlling said motor unit means and thus controlling the movement of said track portion relative to said tank.

9. A machine in accordance with claim 8 having automatic control means including timer means to control the length of time that said track portion is in said lowered position relative to said tank.

10. A machine in accordance with claim 8 wherein said tank includes an inner portion and an outer portion, said inner portion being adapted to contain liquid wax to overflowing, said outer portion adapted to receive the wax overflow from said inner portion, and pump means coacting between said inner and outer tank portions for maintaining said inner tank portion in overflowing condition.

11. A machine in accordance with claim 8 including supply tank means operatively coupled by gravity to said dipping tank for supplying liquid wax to said dipping tank, said supply tank means including a new wax tank adapted to contain a supply of new wax, and an old wax tank adapted to contain reclaimed wax from a candle making line, said new wax and old wax tanks being operatively coupled together for mixture of the wax from the respective tank, and valve means for controlling the flow of liquid wax from said new wax and old wax tanks to said dip tank.

12. A system in accordance with claim 1 including cooling means disposed downstream from said dipping station, said cooling means including a fan and duct work coupling the fan to an exit opening facing upwardly, for causing air flow between formed candles suspended on the associated rack, thereby causing generally uniform cooling of the candles throughout the rack for ensuring generally uniform diameters of finished candles on the associated rack.

13. A system in accordance with claim 12 including stop means adapted for coaction with said rack for automatically stopping and positioning each said rack at a location ahead of said dipping station and subsequently at said dipping station and at said cooling station.

14. A system in accordance with claim 13 including means disposed downstream from said cooling means, and adapted to melt projections of wax from the bottoms of the formed candle bases as said rack passes over said projection melting means, the last mentioned means including a heatable plate positioned with respect to said rack so that the lower extremities of the candles suspended from the respective rack will engage said plate during movement thereover.

15. A system in accordance with claim 1 wherein said wicking station includes a cutter device for cutting wick stock to predetermined lengths from spools of filamentary material movably mounted at said wicking station, the predetermined lengths being adapted for use as the candle wicks.

16. A system in accordance with claim 15 wherein said cutter device comprises a track, a roller carriage mounted on said track, and a cutter blade mounted on said carriage for movement with said carriage generally transverse of the direction of extension of spaced strands of the filamentary material and into cutting relation to the latter.

17. A wicking machine for producing candle wicks in the system of claim 15, said wicking machine comprising a frame, means on the frame for mounting said spools of filamentary material, means for suspending spaced strands of the filamentary material on said frame in suspended relation at the ends thereof, said cutter device being operable to cut the filamentary material transversely of the lengthwise extent thereof whereby the formed candle wicks can be hung in U-shaped form on an overhead carrier rack by placing weights intermediate the held ends thereof.

18. A wicking machine in accordance with claim 17 wherein said cutter device comprises a track, a carriage mounted on said track, and blade means mounted on said carriage for cutting the filaments transversely of the direction of extension thereof.

19. A system in accordance with claim 1 including a coating station upstream from said cut down station for applying an exterior finish coat to candles suspended from a rack, for improving the characteristics of the candles.

20. A system in accordance with claim 19 wherein said exterior finish applying station comprises a dip tank, a reciprocal motor unit mounted above the last mentioned dip tank and coacting with a section of said conveyor system for lowering and raising an associated carrier rack with candles thereon in a generally vertical direction, for applying a relatively thin finish coat of wax to the candles in a dipping operation, and means for heating said last mentioned dip tank for maintaining wax adapted to be received therein in melted condition.

21. A system in accordance with claim 19 wherein said finish coat comprises a wax having a higher melting point as compared to the wax utilized at said dipping station.

22. A system in accordance with claim 19 wherein the wax of said finish coat applied at said coating station possesses a melting point of approximately 160° F., while the wax at said dipping station possesses a melting point of approximately 140° F.

23. A system in accordance with claim 19 including a spraying station disposed downstream from said exterior coat applying station, for spraying the candles with liquid prior to movement thereof to said cut down station.

24. An air-cooling mechanism for use in the system of claim 19, for cooling an overhead carrier rack of the dipped taper candles while the candles are disposed in suspended relation with respect to the rack, said cooling mechanism comprising a fan, duct means from the fan to an upwardly open duct head, means in said head for causing generally uniform application of air flow from the fan via the duct means upwardly through rows of suspended candles on the respective carrier rack, whereby the heat is rapidly eliminated throughout the candle suspension at approximately the same rate for maintaining uniformity of candle diameter throughout the candle suspension.

25. An apparatus in accordance with claim 24 including a tank adapted to contain liquid which is to be sprayed by said spray heads.

26. A system in accordance with claim 23 wherein said spraying station includes a plurality of spray heads including upper spray heads and lower spray heads, past which the candles are adapted to be moved in suspended condition on said rack, each said upper spray head being adapted to spray in one predetermined direction while each said lower spray head being adapted to spray in another predetermined direction.

27. A system in accordance with claim 23 including means for automatically pushing a carrier rack into at least one predetermined position at said spraying station for said spraying operation, the last mentioned means being operative to move the rack that has been held at said spraying station out of the spraying station toward said cut down station upon completion of the spraying operation.

28. A system in accordance with claim 23 wherein said spraying station includes means for applying an acrylic coating to the associated candles at said spraying station.

29. A spraying apparatus for use in the system of claim 23 for applying liquid spray to a batch of dipped taper candles when the candles are disposed in suspended relation from an overhead carrier rack on the overhead conveyor, said spraying device comprising a plurality of generally vertically spaced upstanding conduits each of which has thereon a plurality of spray heads, one of said spray heads being operative to spray liquid in one generally lateral direction, while another of said spray heads operative to spray liquid in the opposite generally lateral direction, suspended candles being adapted to pass by said spray heads and to be coated by liquid from the respective spray head.

30. A system in accordance with claim 1 wherein said cutoff station includes a movable cutter, means for causing movement of said cutter in a generally horizontal plane for cutting off the bases of the suspended candles, and means for actuating and deactuating said clamping means at said cutoff station.

31. A system in accordance with claim 30 wherein said cutoff station includes conveyor means coacting with said cutter for automatic transference of the severed base portions of the candles and the associated candle wick weights, to a storage area preparatory to return of the wax of the cutoff bases and weights to a holding tank for reclaimed wax.

32. A system in accordance with claim 31 including wire basket means coacting with said conveyor means for receiving therein the severed candle base portions and associated wick weights for convenient transference of the latter to the holding tank for reclaimed wax.

33. A candle base cutoff machine for cutting off the bases of dipped candles in the system of claim 30 comprising a frame, said clamping means being mounted on said frame for clamping the bases of candles disposed in suspended relation on an overhead carrier rack, said cutter being heated and including a support carriage for movement in a generally horizontal plane for cutting off the candle bases while the latter are in said clamped condition.

34. A machine in accordance with claim 33 including conveyor means for conveying the cutoff base portions of the candles to a collection point exteriorly of said base cutoff machine.

* * * * *